United States Patent [19]
Bailey et al.

[11] Patent Number: 5,095,259
[45] Date of Patent: Mar. 10, 1992

[54] LOW VOLTAGE, HIGH CURRENT CAPACITY CONNECTOR ASSEMBLY AND MOBILE POWER TOOL AND APPLIANCE OPERATING SYSTEM

[75] Inventors: R. Roby Bailey, Forest Hill; Frederick R. Bean, Hampstead; Martin P. Gierke, Baltimore; Dale C. Grieb, Fallston; Richard Nickels, Jr., Hampstead; Michael L. O'Banion, Westminster; Michael R. Sell, Bel Air; Alfred Schiazza, III, Easton; Richard T. Walter, Baldwin, all of Md.

[73] Assignee: Black & Decker, Inc., Newark, Del.

[21] Appl. No.: 408,932

[22] Filed: Sep. 14, 1989

Related U.S. Application Data

[63] Continuation of Ser. No. 213,293, Jun. 29, 1988, abandoned, which is a continuation-in-part of Ser. No. 860,255, May 6, 1986, abandoned, and a continuation-in-part of Ser. No. 860,260, May 6, 1986, abandoned.

[51] Int. Cl.$^5$ .............................................. H02J 7/00
[52] U.S. Cl. ......................................... 320/2; 320/36
[58] Field of Search ..................... 320/2, 3, 4, 5, 6, 7, 320/15, 16, 35, 36; 329/9, 197; 307/71, 150

[56] References Cited

U.S. PATENT DOCUMENTS 1,486,691  3/1924  Schwartz .......................... 439/675

(List continued on next page.)

FOREIGN PATENT DOCUMENTS

| | | |
|---|---|---|
| 0203847 | 12/1986 | European Pat. Off. |
| 2555601 | 12/1975 | Fed. Rep. of Germany . |
| 2645450 | 4/1978 | Fed. Rep. of Germany . |
| 7773921 | 7/1978 | Fed. Rep. of Germany . |
| 3432294 | 10/1985 | Fed. Rep. of Germany . |
| 3540853 | 5/1987 | Fed. Rep. of Germany . |
| 1075857 | 7/1967 | United Kingdom . |
| 1108357 | 4/1968 | United Kingdom . |
| 2028022 | 2/1980 | United Kingdom . |
| 2037505 | 7/1980 | United Kingdom . |

OTHER PUBLICATIONS

Exide Power Systems Division, ESB, Inc., Instructions—Type EMF-5 and EMFC-5, 10/1969.
"New Battery Tools for Outdoor Chores", Popular Science, Gallager, Jun. 1962, pp. 149-151 and 206.
Photos of Ski Hedge Trimmer with Battery Belt Pack, Nov. 11, 1976.
Video Review, Jul. 1982, p. 83, Kapco Communications Advertisement.
Video, Dec. 1984, p. 102, "Ambico's Decathalon NiCad Power Pack".
Video Review, Jun. 1985, p. 122, Ambico Adveristment.
Video Review, May 1984, p. 75, VDO-Pack Advertisement.
1984 Renault Encore Owner's Manual, p. 56, 1983.
Petersen's Basic Ignition and Electricity Systems, No. 3, Petersen Publication, p. 177, 1973.

Primary Examiner—Steven L. Stephan
Assistant Examiner—Kristine Peckman
Attorney, Agent, or Firm—Finnegan, Henderson, Farabow, Garrett & Dunner

[57] ABSTRACT

A mobile power tool and appliance operating system includes a portable lead-acid battery pack having a high current capacity socket compatible with existing low current plugs used with appliances intended to operate from automotive cigarette lighter sockets. Matable high current capacity plugs are attached to power tools and appliances through retractable cords. The battery pack is receivable in a 120 VAC powered charging base having a self-contained charging circuit including a transformer and a voltage regulator. The high current socket housing prevents inadvertent operation with an automotive cigarette lighter plug, and the high current plug housing prevents electrical contact in a automotive cigarette lighter socket, for safety reasons. In another embodiment, the battery pack is provided with two sockets for delivering different power outputs at each respective socket. Recharging of the battery pack can also be accomplished via connection made to one of the sockets.

31 Claims, 17 Drawing Sheets

U.S. PATENT DOCUMENTS

| | | | |
|---|---|---|---|
| 1,984,398 | 12/1934 | Dame | 429/97 X |
| 2,003,948 | 6/1935 | Mess | 439/381 |
| 2,117,409 | 10/1939 | Hummert | 173/324 |
| 2,477,013 | 7/1949 | Spencer et al. | 439/657 |
| 2,520,739 | 8/1950 | Shaw | 439/668 |
| 2,576,174 | 11/1951 | Denine | 439/668 |
| 2,648,758 | 8/1953 | Kroll et al. | 219/264 |
| 2,939,940 | 6/1960 | Dening et al. | 219/264 |
| 2,954,544 | 9/1960 | Focosi | 439/668 |
| 2,991,376 | 7/1961 | Sherwood | 307/156 |
| 3,040,285 | 6/1962 | Stanley | 439/252 |
| 3,092,430 | 6/1963 | Miller | 339/32 |
| 3,274,476 | 9/1966 | Wildum | 320/2 |
| 3,426,317 | 2/1969 | Krol | 439/581 |
| 3,453,578 | 7/1969 | Fernald | 337/195 |
| 3,520,120 | 7/1970 | Hardin, Jr. | 56/11.9 |
| 3,546,665 | 12/1970 | Zak | 439/825 |
| 3,710,306 | 6/1973 | McCarthy | 339/103 |
| 3,886,301 | 5/1975 | Cronin et al. | 439/33 X |
| 3,912,998 | 10/1975 | Harris | 320/2 |
| 3,919,615 | 11/1975 | Niecke | 320/2 |
| 3,932,020 | 1/1976 | Gilbert | 439/675 |
| 3,952,239 | 4/1976 | Owings et al. | 320/2 |
| 3,963,972 | 6/1976 | Todd | 320/2 |
| 4,011,000 | 3/1977 | Wharton | 439/668 |
| 4,249,035 | 2/1981 | Watley | 439/535 |
| 4,498,726 | 2/1985 | Mattis | 439/668 |
| 4,513,238 | 4/1985 | Orban | 320/36 |
| 4,528,492 | 7/1985 | Inaniwa et al. | 320/36 |
| 4,586,766 | 5/1986 | Hofmeister | 439/160 |
| 4,611,878 | 9/1986 | Hall et al. | 439/668 |
| 4,695,105 | 9/1987 | Ney et al. | 439/620 X |
| 4,748,344 | 5/1988 | Sing | 320/2 |
| 4,867,692 | 9/1989 | Kerek | 439/101 |

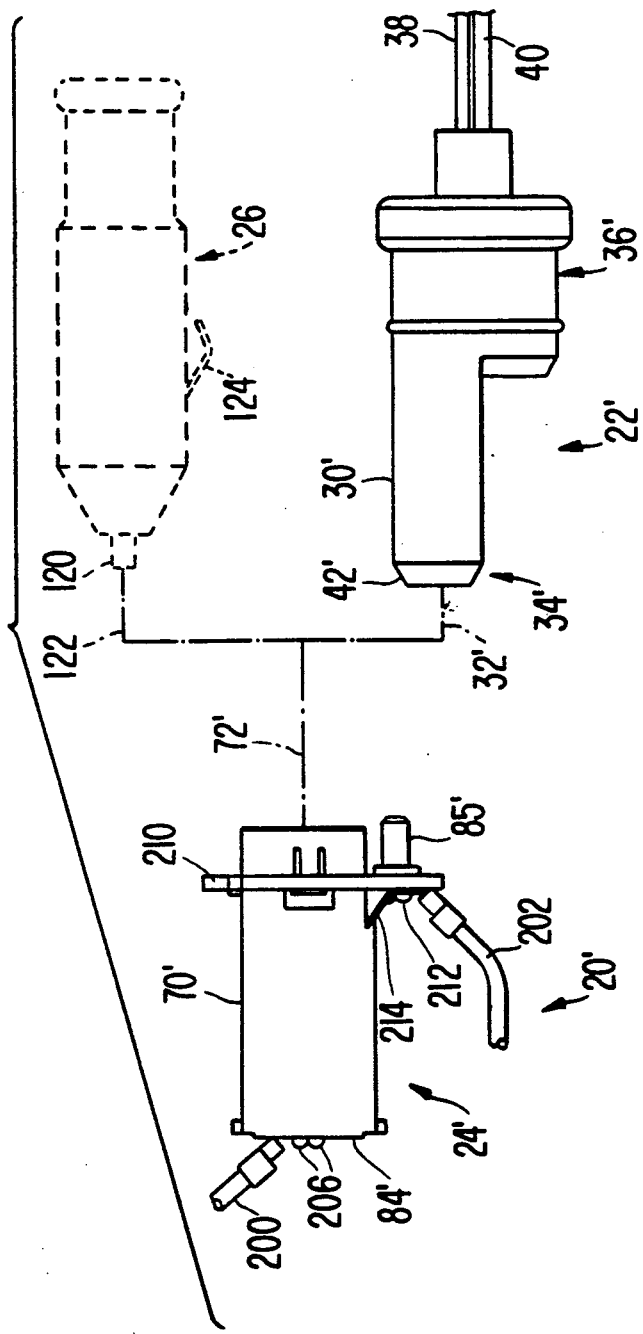

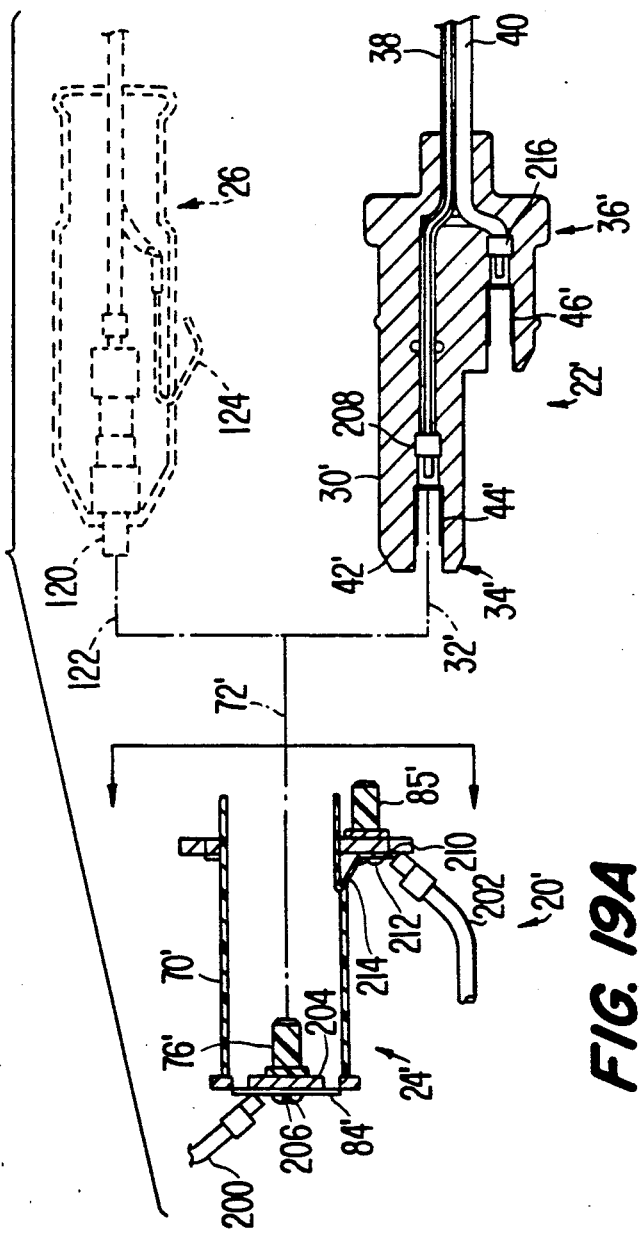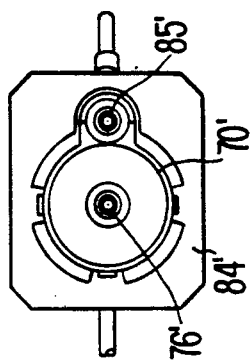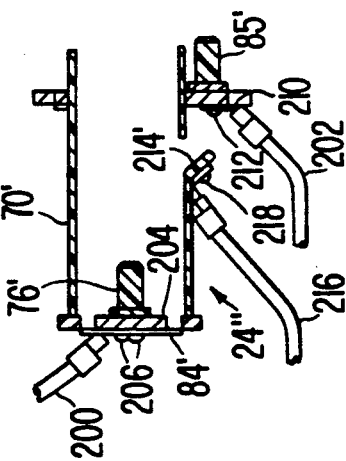

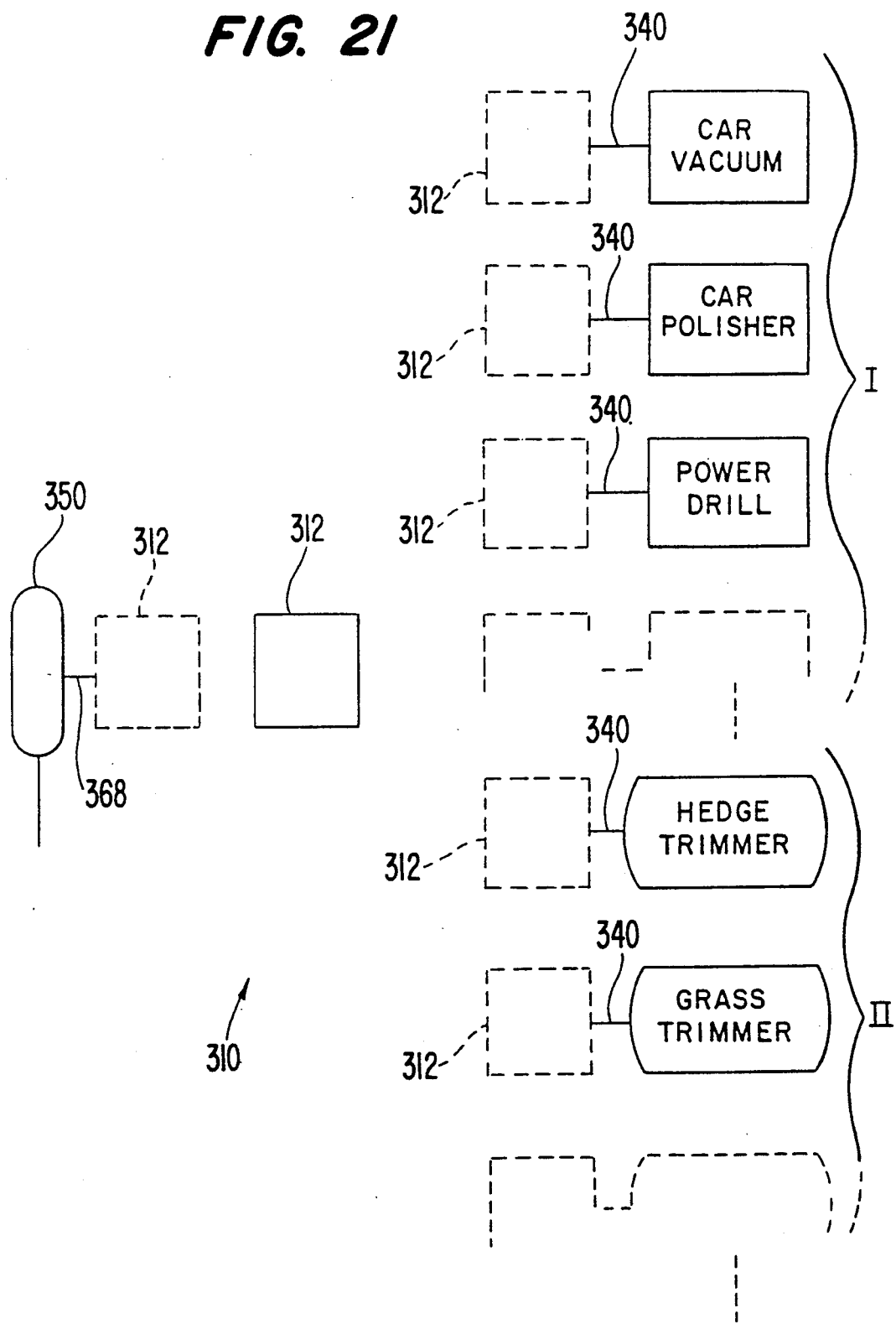

5,095,259

LOW VOLTAGE, HIGH CURRENT CAPACITY CONNECTOR ASSEMBLY AND MOBILE POWER TOOL AND APPLIANCE OPERATING SYSTEM

RELATED APPLICATIONS

This application is a continuation of application Ser. No. 213,293, filed June 29, 1988, now abandoned. Application Ser. No. 213,293 is a continuation-in-part of U.S. patent application Ser. Nos. 06/860,255 and 06/860,260, both filed May 6, 1986, both abandoned.

BACKGROUND

1. Field of the Invention

The present invention relates to low-voltage type connectors having a high direct current capacity for use with battery-powered heavy duty appliances.

The present invention further relates to a system for operating battery powered, hand-held power tools and appliances, including tools and appliances having a high direct current capacity.

2. Description of Background

In recent years, low-voltage direct current (e.g., 12 VDC) hand-held appliances and tools have proliferated for use in the car and around the home. Some appliances, such as the hand-held automobile vacuum cleaners and automobile polishers, are intended for operation using power supplied from the car battery. These appliances, which are relatively low current devices (i.e., 2-6 amps), typically employ a plug connector compatible with the socket component of a conventional, dash-mounted automotive cigarette lighter. The necessity for use of these appliances in close proximity to a vehicle having a lighter socket has restricted somewhat the utilization of the same appliances around the home.

Many hand-held tools used around the home, in comparison, require relatively high current levels (i.e., 8-20 amps). These high current appliances include hedge trimmers, grass trimmers, etc., which can seriously tax the capacity of self-contained battery packs which typically are of the NiCd variety. A portable, lead-acid battery pack has been proposed as offering increased power capacity and longer operation times between charging. As the proposed battery pack would not be self-contained with the power tool or appliance itself, an important feature of the proposed system would be a low-voltage high current capacity connector assembly that would enable the battery pack to be connected and disconnected to a variety of different tools.

Moreover, because of the existence of a variety of automotive appliances having cigarette lighter socket-compatible low current plug connectors, a high current capacity connector assembly that could, without modification, accommodate existing low-voltage, low current plug connectors would extend the usefulness of the proposed system.

An operating system using a portable battery pack having increased power capacity and longer operation times between charging would be highly desirable for these high direct current tools. The system should enable the battery pack to be selectively connectable to a variety of different tools to maximize utility. Moreover, an ability to accommodate existing low current plug connectors would further extend the usefulness of the system.

Another feature desireable in such portable power supply systems relates to the ability to connect devices which have different voltage requirements. For example, while many of the high current devices described above may utilize 12 volts as the operating voltage, other hand-held tools operate at 24 volts; such tools typically have lower current requirements than those operable at 12 volts. It is therefore desireable to provide a portable supply permitting connection of both types of tools so that either can be powered from the same source.

A further feature associated with such portable supplies relates to recharging the batteries of the supply system. In conventional prior art systems, recharging is typically accomplished via a plug or other connector assembly whose function is dedicated strictly to recharging. In order to minimize the number of components, and hence cost and complexity of such systems, it is desireable to provide a charging arrangement utilizing the same connector assemblies otherwise used for powering the various tools that can be connected to the supply.

SUMMARY OF THE INVENTION

In accordance with the purposes of the invention, as embodied and broadly described herein, the socket for a low-voltage, high direct current connector of the plug-and-socket type of this invention comprises a non-conductive, generally cylindrical housing having an axis and a plug-receiving axial end, and a first wiping electrical contact element positioned within the housing at the other housing axial end proximate the axis. The socket further includes a second wiping electrical contact element electrically isolated from the first element and proximate the outer housing periphery at a preselected circumferential position. The second wiping contact element has at least one wiping contact surface parallel to the axis and substantially perpendicular to the housing outer periphery at the circumferential position. The first and second wiping contact elements are configured for mating with complementary wiping contact members carried by a high current plug during plug insertion to a predetermined axial location.

Preferably, the socket is further configured to optionally receive conventional low current automotive appliance plugs of the type having an axially positioned abuttable contact member at the insertable plug end and a spring contact member positioned at the low current plug periphery. In this case the first wiping contact element includes means for electrically connecting to the abuttable contact member and the second wiping contact element includes means for electrically connecting to the spring contact member when the end of the low current plug is inserted in the socket to a predetermined axial location.

It is still further preferred that the socket include lockout means for preventing electrical connection to at least one of the first and second wiping contact elements upon insertion into the socket of a conventional automotive cigarette lighter plug of a kind having a generally cylindrical housing with an axially insertable end and having a heating element coiled in the axial face of the insertable lighter plug housing end.

In a first preferred embodiment, the second wiping contact element comprises a barrel support portion positioned within the housing and opposed integral ear portions extending substantially radially outward from the barrel portion parallel to said housing axis and substantially perpendicular to the housing periphery. The socket further includes a socket lead comprising a tab extending from, and integral with, the barrel portion, and spring means comprising a second tab integral with the barrel portion, the second tab being configured and positioned for engaging recesses in the periphery of a plug to restrain the inserted plug against axial movement counter to the insertion direction.

Further in accordance with the present invention, the plug for a low-voltage, high direct current connector assembly of the plug-and-socket type of this invention comprises a generally cylindrical housing formed from a non-conductive material and having an axis and a housing axial end insertable in a socket. The plug has a first wiping contact member positioned at the insertable housing end and a second wiping contact member electrically isolated from the first member and positioned adjacent the periphery of the plug housing. The second member has at least one planar wiping contact surface disposed parallel to the housing axis.

It is preferred that the plug include safeguard means for preventing electrical connection to at least one of the first and second wiping contact members upon inadvertent insertion of the plug into a conventional automotive cigarette lighter socket of the type having a contact face disposed in a plane axially spaced from a plug-receiving end and perpendicular to the direction of plug insertion.

In the first preferred embodiment, the second member is U-shaped and protrudes radially outward of the plug housing at diametrically opposed locations, the bottom of the U-shaped member bieng oriented toward the housing insertion end, and the protruding sides of the U-shaped member forming two pairs of planar wiping contact surfaces.

Still further in accordance with the present invention, the low-voltage, high direct current connector assembly of this invention comprises an elongated, hollow socket having an axis of elongation, a pair of socket leads, and a plug-receiving axial end; a plug receivable in the socket end upon insertion along the axis and having a pair of plug leads; and means for retaining the plug in the socket at a predetermined axial insertion position. The assembly also includes a first wiping contact means for electrically connecting a respective one of the pair of socket leads to a respective one of the plug leads at the insertion position, the first wiping contact means including first mating contact surfaces positioned proximate the axis. The assembly also includes second wiping contact means electrically interconnecting the other of the pair of socket leads to the other of the pair of plug leads at the insertion position, the second wiping contact means including second mating contact surfaces positioned distant the axis.

Preferably, the second wiping contact means also comprises means for orienting the plug circumferentially with respect to the axis, and wherein the socket includes an axial socket extension cooperating with the second wiping contact means for orienting the plug.

According to another embodiment of the present invention, a low-voltage, high direct current connector assembly comprises: an elongated, hollow socket having a central axis and a pair of socket leads; a plug receivable in the socket upon insertion along the axis, the plug having a pair of plug leads; first contact means for electrically connecting a respective one of the pair of socket leads to a respective one of the plug leads upon insertion of the plug into the socket, the first contact means being positioned proximate the axis; and second contact means for electrically interconnecting the other of the pair of socket leads to the other of the pair of plug leads upon insertion of the plug into the socket, the second contact means being positioned radially distant from the axis, the second contact means including pin-and-sleeve contact means for orienting the plug circumferentially with respect to the axis upon insertion of the plug into the socket, the pin-and-sleeve contact means engaging at a site longitudinally distant from the first contact means relative to the axis.

In accordance with another aspect of the present invention, as embodied and broadly described herein, a system for operating one-at-a-time a plurality of different hand-held, low-voltage, direct current power tools and appliances of the present invention comprises a portable battery pack, and first electrical connector means for selectively connecting any one of the plurality of tools and appliances to the battery pack, for mobile operation thereof. The system also includes regulated charging means energizable by standard 120 volt AC house current, the charging means including a housing and charging circuit means including a transformer and voltage regulator contained in the housing, and second electrical connector means for selectively connecting the battery pack to the charging means.

Preferably, the battery pack includes at least one battery of the lead-acid type, and the first electrical connector means includes a high current connector assembly of the plug-and-socket type. The plug component includes safeguard means for preventing insertion into an automotive cigarette lighter socket.

It is also preferred that the socket component is adapted for receiving, and electrically connecting to, low-voltage tool and appliance plugs intended for operation in an automotive cigarette lighter socket, and that the socket component includes lockout means for preventing insertion of an automotive cigarette lighter plug.

Further in accordance with the present invention, the hand-held, low-voltage, high direct current power tool operating system of the present invention comprises a hand-held, low-voltage, high direct current power tool having an operational end, a power cord, and cord control means for biasing the power cord away from the ground and away from the operational end. The system further includes a portable battery pack including a lead-acid battery, and first high direct current electrical connector means for selectively connecting the power cord to the battery pack for mobile operation of the power tool; and regulated charging means energizable by standard 120 volt AC house current, the battery pack being selectively connectable to the charging means.

Preferably, the high direct current power tool includes a tool handle positioned distant from the operational end, the power cord being self-retractably coiled and connected to the tool at the handle.

Still further in accordance with the invention, as embodied and broadly described herein, the system for operating one-at-a-time a plurality of different hand-held, low-voltage, direct current power tools and appliances of the present invention comprises a portable battery pack, and electrical connector means for selectively connecting any one of the plurality of tools and appliances to the battery pack, for mobile operation thereof, wherein the electrical connector means includes a high current connector assembly of the plug-and-socket type. The socket component of the plug-and-socket assembly is incorporated in the battery pack, and the plug component is connected to the one tool or appliance. The socket component is adapted for also receiving, and electrically connecting to, low-voltage tool and appliance plugs intended for operation in an automotive cigarette lighter socket.

According to another embodiment of the present invention, a rechargeable system is disclosed for operating one-at-a-time a plurality of different hand-held, direct current power tools and appliances, the system comprising: a rechargeable portable battery pack; first electrical connector means for selectively connecting individual ones of the plurality of tools and appliances to the battery pack for mobile operation thereof; and second electrical connector means for connecting a recharging source to the battery pack for recharging thereof, the second electrical connector means also being adapted for selectively connecting other individual ones of the plurality of tools and appliances to the battery pack for mobile operation thereof.

In this second embodiment of the invention, circuit means are provided for selectively delivering a first voltage level to the first electrical connector means and a second voltage level to the second electrical connector means. For example, where the battery pack includes a pair of lead-acid batteries, the circuit means selectively connects the batteries in series to deliver the first voltage level and in parallel to deliver the second voltage level.

The accompanying drawings, which are incorporated in and constitute a part of this specification, illustrate presently preferred embodiments of the invention and, together with the description, serve to explain the principles of the invention.

BRIEF DESCRIPTION OF THE DRAWINGS

FIG. 18 is a perspective side view of a second embodiment of a connector assembly of the plug-and-socket type made in accordance with the present invention.

FIG. 19 is a cut-away cross-sectional depiction of the connector assembly shown in FIG. 18.

FIG. 19A is a cut-away cross-sectional depiction of a further embodiment of the socket shown in FIG. 19.

FIG. 20 is a top plan view of the socket of the connector assembly shown in FIG. 18.

FIG. 21 is a schematic representation of the mobile power tool and appliance system according to another aspect of the present invention.

DESCRIPTION OF THE PREFERRED EMBODIMENT

Reference will now be made in detail to the present preferred embodiments of the invention, examples of which are illustrated in the accompanying drawings.

Figure 1:
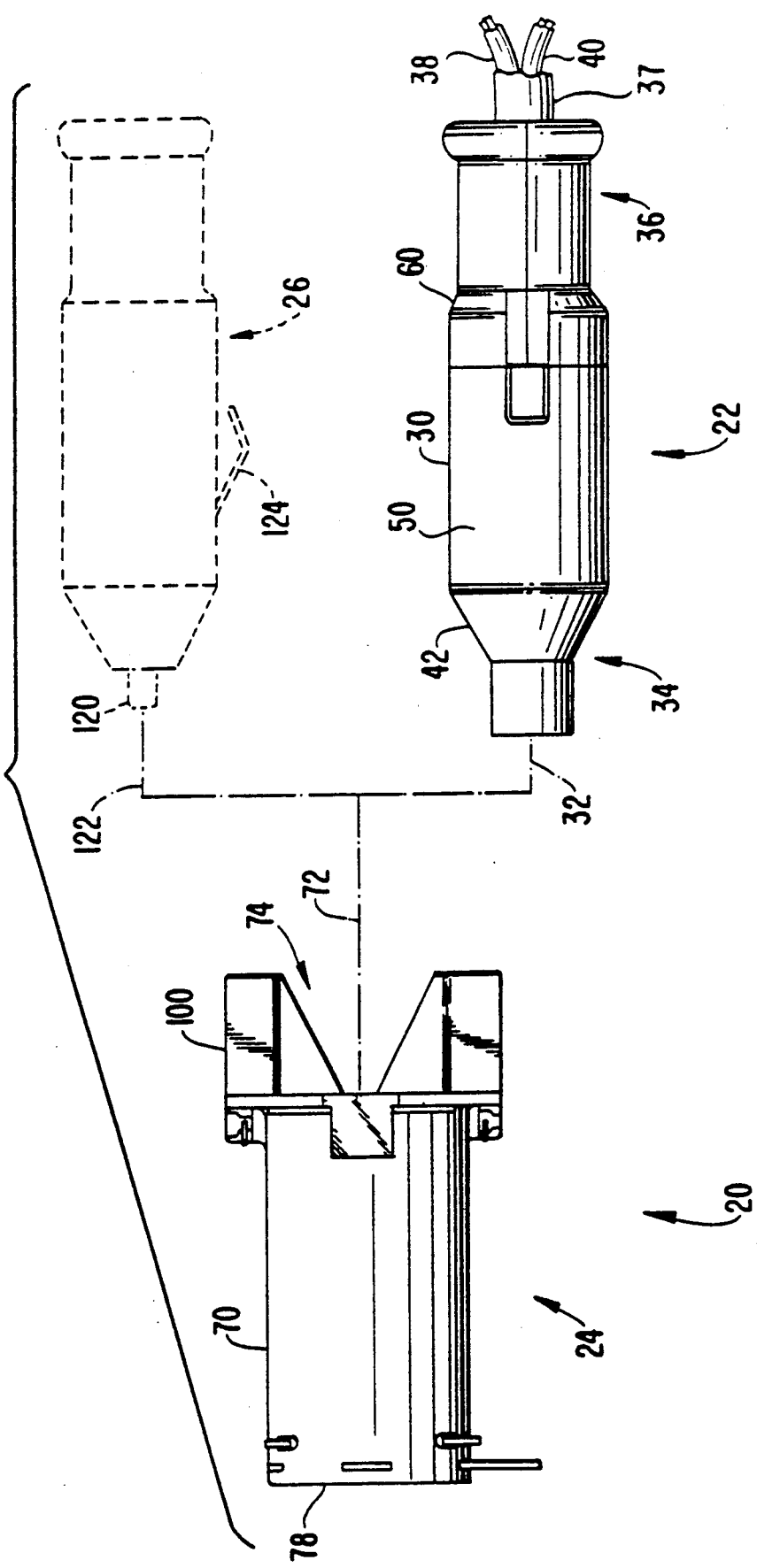
FIG. 1 is a schematic side view of a connector assembly of the plug-and-socket type made in accordance with the present invention.

The preferred embodiment of the low-voltage, high current capacity connector assembly of the present invention is shown in FIG. 1 and is represented generally by the numeral 20. Connector assembly 20, which is of the plug-and-socket type, in turn includes a plug component, designated generally as 22, and a socket component designated generally by the numeral 24. Also shown in FIG. 1, for reasons that will become apparent from the succeeding discussion, is a broken-line representation of a low-voltage, low current plug connector such as is conventionally used to power automotive appliances from a cigarette lighter socket, the conventional plug connector being designated generally by the numeral 26.

In accordance with the present invention, the plug component of the low-voltage, high direct current capacity connector assembly includes a generally cylindrical housing having an axis and an axial end intended to be insertable in a socket component. As embodied herein, and as shown particularly in FIGS. 1 and 2, plug 22 includes cylindrical housing 30 having an axis 32 and an axial end 34 intended to be inserted into socket 24. Plug 22 also includes an opposed axial end designated generally 36 which can be configured for gripping by a user and from which power cord 37 having plug leads 38, 40 extends for connection to a suitable appliance or power tool (not shown). Housing 30 preferably is formed of an appropriate non-conductive material such as a moldable, impact-resistant plastic and can be formed in two mating halves, for permitting "clamshell" type assembly or molded as one piece around internal parts ("insert molded"). It is preferred that plug end 34 include a face member 42, also formed of a non-conductive material. Face member 42 can be formed integrally with cylindrical housing 30 and can be provided with a shape suitable for providing a "lead in" function to assist in insertion into socket 24, such as the truncated conical "lead-in" shape used in the embodiment pictured in FIG. 1.

Further in accordance with the present invention, the plug component includes a first wiping electrical contact member positioned at the insertable housing end. By the term "wiping contact" it is meant that the contact member has a significant contiguous contact surface area which comes into sliding contact with an opposing contact member also having a significant contiguous contacting surface during the course of establishing the electrical connection between the two members. The "wiping" engagement acts to rejuvenate the metal contact surface by removing at least in part any oxide or other non-conductive layer that may have built up on the contact surface. The completed contact is characterized by electrical conduction across the mating contacting areas thereby affording high current capacity and minimizing ohmic heating due to contact imperfections and contamination.

Figure 2:
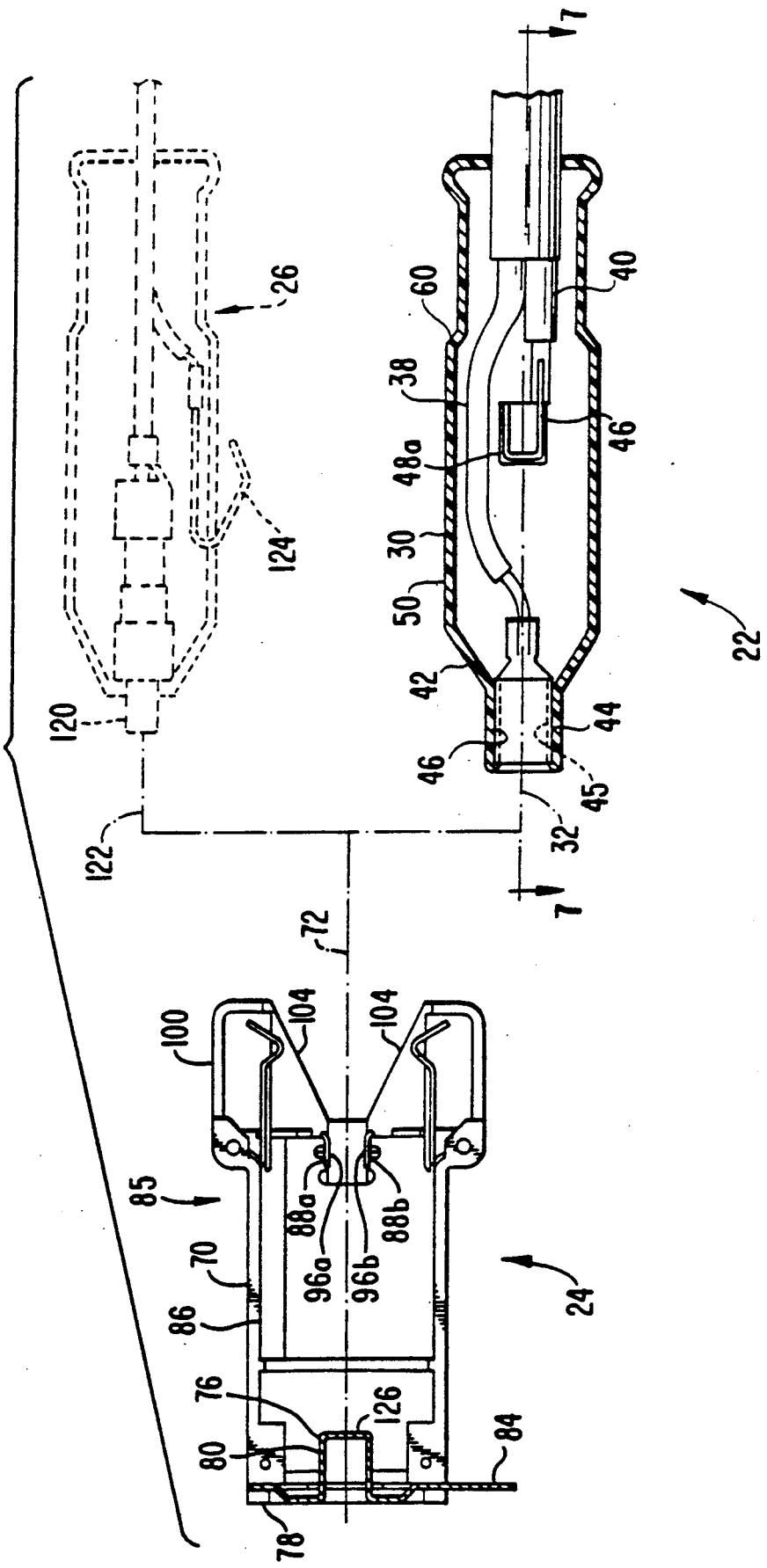
FIG. 2 is a cut-away depiction of the connector assembly shown in FIG. 1.

As embodied herein, and with initial reference to FIG. 2, a hollow conductive sleeve 44 is positioned in port 46 formed in plug face 42. Again, these elements can be insert molded in a one-piece molding. Sleeve 44 can be made of brass or similar conductive, resilient material and is shown with a crimped connection to plug lead 38. Sleeve 44 is aligned on plug axis 32 for reasons that will become apparent in the subsequent discussion regarding the mating contact element positioned in socket 24.

Further in accordance with the present invention, a second wiping contact member is provided in the plug isolated from the first wiping contact member and extending radially outward from the periphery of the plug housing. The second wiping contact member includes at least one planar wiping surface disposed parallel to the housing axis and perpendicular to the plug housing periphery. As embodied herein, and with initial reference to FIG. 2, plug 22 includes "U"-shaped channel member 46 positioned transverse to plug housing axis 32 and extending through apertures 48a,b formed at diametrically opposed positions in housing 30; see also FIG. 7. Tab portion 47 of U-shaped contact member 46 is electrically connected to plug lead 40 by conventional means such as crimping or soldering. As best seen in FIG. 7 and FIGS. 15-17, the U-shaped wiping contact member 46 can be economically formed from a single piece of sheet metal, such as brass or other resilient material, and includes appropriate reliefs to permit captive assembly into housing 30 if a "clamshell" construction is utilized.

Figure 15:
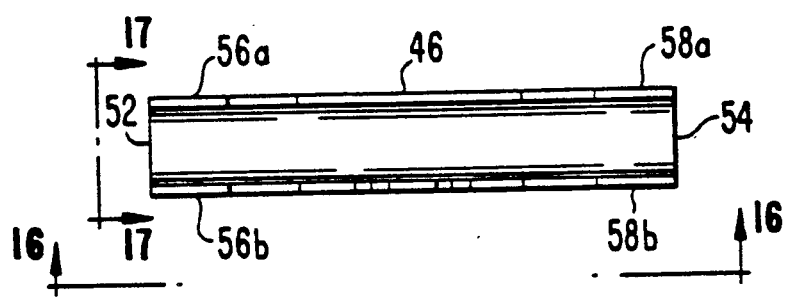
FIGS. 15-17 are top, side, and end views, respectively, of the U-shaped member contact of the plug component shown in FIG. 1.
Figure 16:
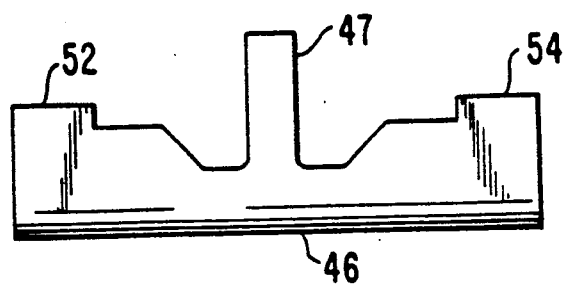
Figure 17:
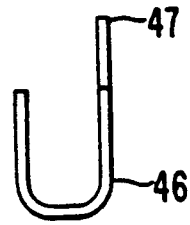

Importantly, U-shaped wiping contact member 46 is sized to have a transverse length extending beyond the outer peripheral surface 50 of plug housing 30 such that portions 52 and 54 of the U-shaped member extend outside of housing 30 in a "wing"-like configuration. As thus configured, U-shaped contact member 46 provides two pairs of planar wiping contact surfaces for engagement by a suitable mating contact element in socket component 24, to be discussed henceforth. Specifically, and as best seen in FIG. 15, member portion 52 includes a first pair of mating contact surfaces 56a,b while member portion 54 provides a second pair of wiping contact surfaces 58a,b which would be disposed on the opposite side of housing 30 from wiping surface pair 56a,b. Also, as best seen in FIG. 2, U-shaped wiping contact member 46 is disposed with the bottom of the "U" oriented in the direction of insertion to provide a "lead in" to the mating wiping contact element of socket component 24. Although not shown in the drawings, the balance of the internal configuration of plug component 22 can include suitable structure for providing strain relief for plug leads 38, 40 as well as appropriate support structure to provide internal rigidity to housing 30.

Figure 7:
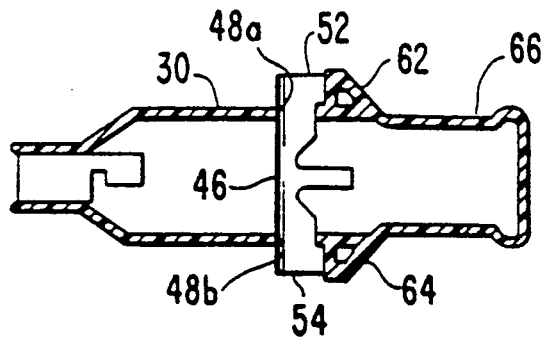
FIG. 7 is a sectional top view of the plug component of FIG. 1 taken along the line 7—7.

It is also preferred that plug 22 include a shoulder 60 in housing 30 to provide an engagement surface for resilient spring fingers 106, 108 provided with socket component 24, which fingers, as will be discussed henceforth, act to restrain movement of plug 22 counter to the insertion direction whenever plug 22 has been inserted to a predetermined axial insertion depth. As best seen in FIG. 7, housing 30 preferably has a pair of flanges 62, 64 integrally formed with housing 30 at an axial location between the protruding portions 52, 54 of U-shaped member 46 and the gripping location 66 on plug housing 30. Flange members 62, 64 are sized to "shadow" protruding U-shaped member portions 52, 54 to protect the user's hand during the insertion operation.

Further in accordance with the present invention, the socket component of the low-voltage, high direct current connector assembly includes a non-conductive, generally cylindrical housing having an axis and a plug-receiving axial end. As embodied herein, and with initial reference to FIGS. 1 and 2, socket component 24 includes cylindrical socket housing 70 having an axis 72 and end 74 configured for receiving plug component 22. Socket housing 70 also can be made from an impact-resistant, moldable plastic material and can be made in two joinable halves in a "clamshell" like construction.

Figure 5:
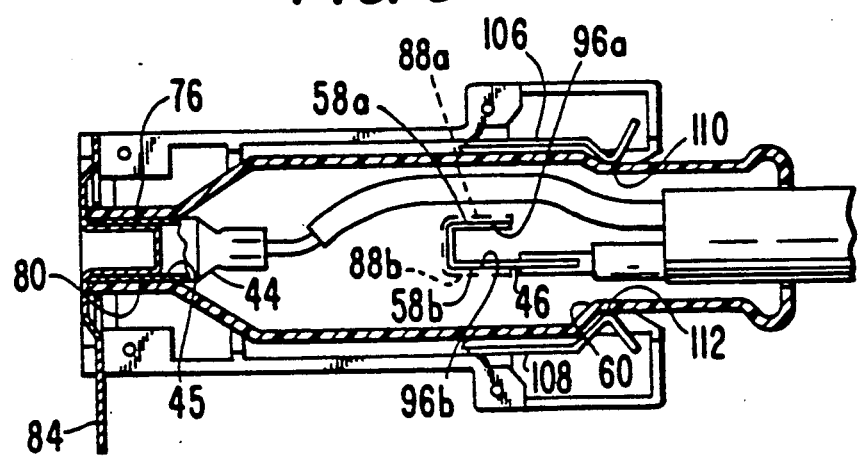
FIG. 5 is a cut-away view showing the high current plug component of FIG. 1 mated with the high current socket component of FIG. 1.
Figure 11:
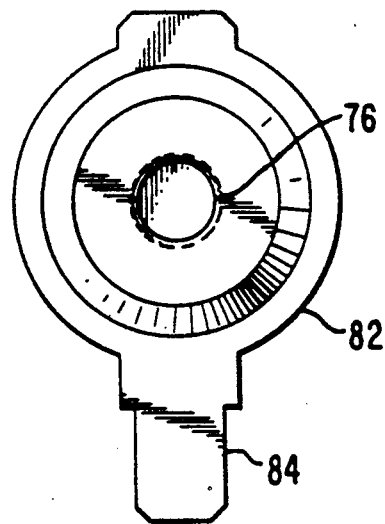
FIGS. 11 and 12 are top and side views, respectively, of the pin contact used in the socket component of FIG. 1.
Figure 12:
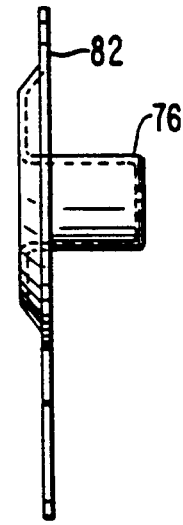

Further in accordance with the present invention, the socket component includes a first wiping electrical contact element positioned within the housing proximate the housing axis at the housing axial end distant the plug-receiving end. As embodied herein and as best seen in FIG. 2, plug 24 includes conductive pin 76 having a cylindrical shape and aligned along socket housing axis 72 at housing axial end 78. Pin 76 is sized to provide an interference fit between outer cylindrical surface 80 of pin 76 and cylindrical surface 45 of sleeve member 44 whenever plug component 22 is inserted into socket component 24 to the predetermined axial insertion location, as is depicted in FIG. 5. Preferably, and as best seen in FIGS. 11 and 12, pin 76 can be formed from a single piece of sheet metal to provide an integral base support 82 which can be captured with the "clamshell" construction of socket housing 70 using techniques well-known to those skilled in the art. Also, a tab portion 84 can be formed on the same sheet metal piece extending from base portion 82 to provide a socket lead to connect pin 76 electrically to one terminal of an external power source (not shown).

Figure 6:
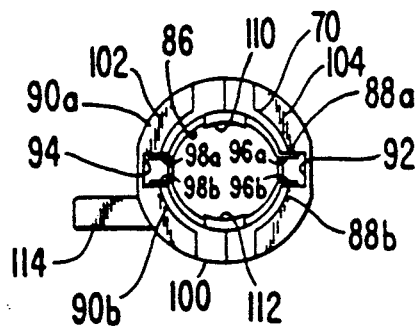
FIG. 6 is a frontal view taken along the line 6—6 in FIG. 3.

Further in accordance with the present invention, the socket component includes a second wiping electrical contact element electrically isolated from the first element and positioned proximate the outer periphery of the housing at a preselected circumferential position. The second wiping contact element has at least one wiping contact surface oriented substantially perpendicular to the housing outer periphery at the circumferential position. As embodied herein, and with initial reference to FIG. 2, socket component 24 includes second contact element 85 having conductive, barrel-shaped support member 86 positioned within the cylindrical housing 70 proximate plug-receiving end 74. Second contact 85 further includes two pairs of ears 88a,b and 90a,b (see FIG. 6) integrally formed from, and extending substantially radially outward from, barrel portion 86 and positionable in corresponding slots 92, 94 formed in housing 70. The inwardly facing surfaces of opposing ears 88a,b and 90a,b provide the complementary mating wiping contact surfaces for engagement with surfaces 56a,b and 58a,b of U-shaped contact member 46 carried by plug component 22. Specifically with reference to FIG. 6, ears 88a,b have corresponding planar mating surfaces 96a,b while ears 90a,b have mating surfaces 98a,b. When plug component 22 is inserted into socket component 24 to the prescribed axial insertion location as depicted in FIG. 5, the respective complementary mating surfaces of the contact elements associated with socket member 24 are seen to engage the corresponding surfaces in the contact members associated with plug component 22. Thus, cylindrical surface 80 of pin 76 is seen to engage cylindrical surface 45 of sleeve 44 while planar mating surfaces 96a,b of ears 88a,b can be seen to engage surfaces 58a,b of protruding portion 54 of U-shaped member 46.

The protruding portions 52, 54 of the U-shaped contact member 46 in plug 22 in conjunction with the slots 92, 94 in socket housing 70 also act to orient plug component 22 circumferentially with respect to socket component 24. Additionally, socket housing 70 includes cylindrical extension 100 at housing end 74, which housing extension includes a pair of "V"-shaped notches 102, 104 (see FIGS. 2 and 6) for guiding protruding portions 52, 54 into engagement with ears 96a,b and 98a,b of contact element 85.

Figure 3:
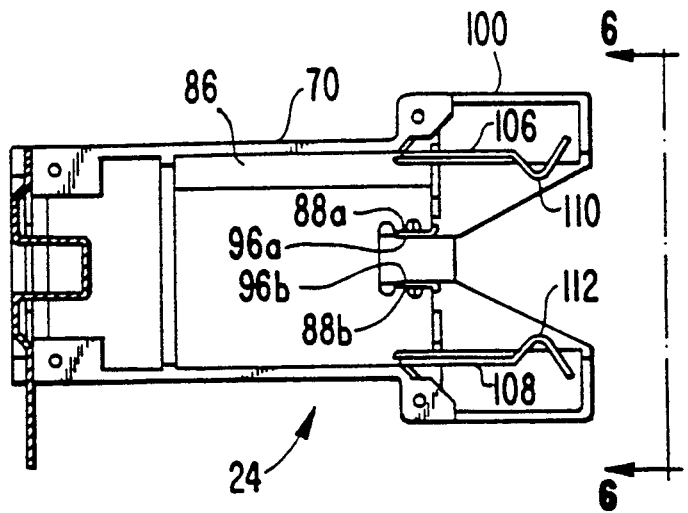
FIG. 3 is a cut-away view of the socket component shown in FIG. 1.
Figure 13:
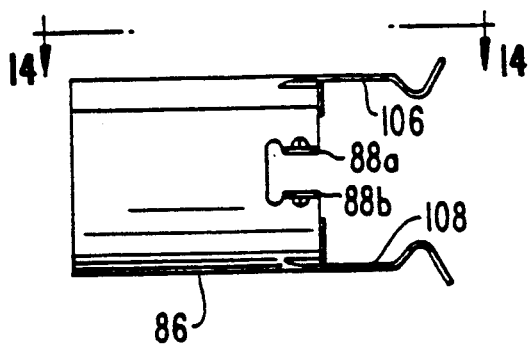
FIGS. 13 and 14 are side and top detail views of the barrel contact used in the socket component of FIG. 1.
Figure 14:
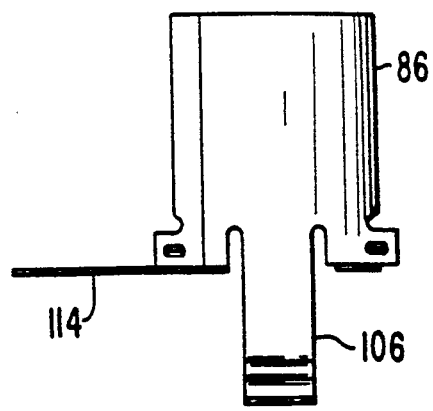

With initial reference to FIG. 3, it is also preferred that socket component 24 include a pair of spring fingers 106, 108 resiliently mounted in socket housing 70. Spring fingers 106, 108 have radially inwardly depending portions 110, 112 which cooperate with shoulder 60 on plug component 22 to retain plug 22 in socket 24 at the predetermined axial insertion position as is shown in FIG. 5. Housing axial extension 100 of socket component 24 can be enlarged to accommodate the radially outward flexing of spring fingers 106, 108 during the insertion process. Also, and with reference to FIGS. 13 and 14 of the drawings, spring fingers 106, 108 can conveniently be integrally formed from the same sheet metal piece used to form barrel portion 86, and ears 96a,b and 98a,b where spring fingers 106, 108 would comprise tab portions. Still further, and as best seen in FIG. 14, a tab portion 114 can be formed with contact element 85 and used as the second socket electrical lead, with tab 84 of pin 76 being the first socket electrical lead.

Figure 4:
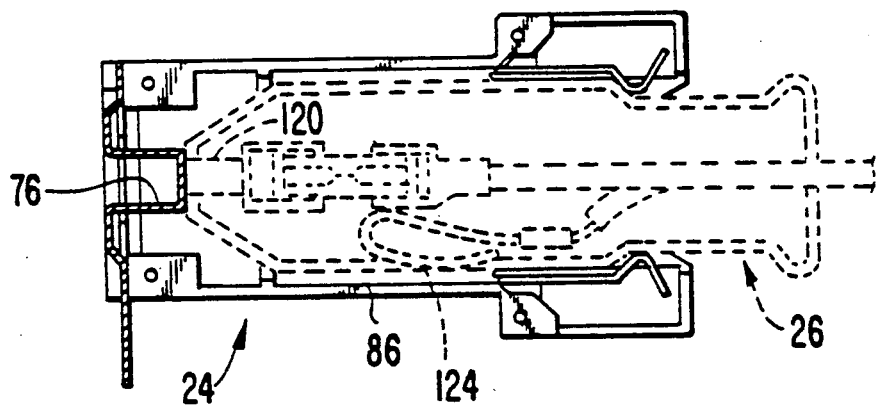
FIG. 4 is a cut-away view of the socket of FIG. 1 also showing insertion of low-voltage type plug connector.

It is also highly preferred that the socket component of the low-voltage, high current connector assembly of the present invention be configured to optionally receive conventional low current automotive appliance plugs. These plugs, an example of which is shown as 26 in dotted lines in FIGS. 1 and 2, typically have an axially positioned, abuttable contact member such as spring loaded contact pin 120, shown positioned on low current plug axis 122, together with a spring contact member, such as a bent wire spring contact 124, located at the periphery of plug 26. For these embodiments of the socket component of the present invention, pin 76 specifically includes a closed pin face 126 sized and positioned for providing abutting engagement with abuttable contact member 120 upon insertion of low current plug 26 into socket component 24; see FIG. 4. Additionally, barrel portion 86 of second contact 85, which is conductive and electrically connected to socket lead 114, is extended axially toward socket end 78 a distance sufficient to provide engagement with spring contact member 124 when plug 25 is inserted. Further, to insure compatibility with car appliances having connectors like plugs 26, pin 76 preferably has a positive polarity and second contact element 85 a negative polarity.

As stated previously, the low-voltage, high current connector assembly of the present invention is intended to be utilized in the mobile power tool and appliance operating system described further herein. Because of the compatibility of the socket component of the connector assembly of the currently preferred embodiment of the present invention with conventional low current plugs used with automotive appliances, there is the potential for inadvertent operation of the high current plug component 22 in a standard cigarette lighter socket in an automobile. Because the fusing system of an automobile often is set for low current lighter operation (e.g., 6 amps), if a user attempted to operate a high current power tool or appliance from the car battery utilizing plug component 22 there is a possibility of blowing the fuse or possibly causing damage to the automobile's electrical wiring system.

Figure 10:
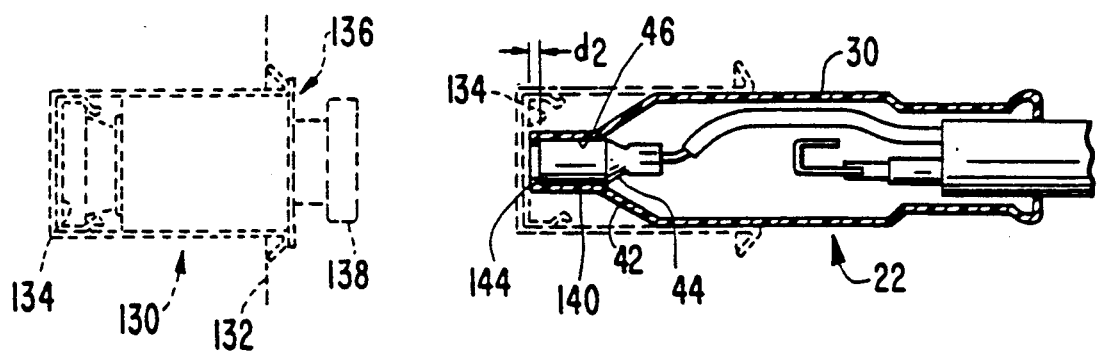
FIG. 10 is a sectional view of plug component of FIG. 1 showing details of structure for preventing electrical contact during insertion into automotive cigarette lighter socket.

Consequently, it is preferred that safeguard means be included in the construction of plug component 22 for preventing electrical connection to at least one of sleeve 44 and U-shaped contact member 46 during inadvertent insertion of plug 22 into a conventional automotive cigarette lighter socket. With initial reference to FIG. 10, a conventional cigarette lighter socket (shown in broken lines) designated generally by the numeral 130 and shown mounted in a dashboard 132 includes an electrical contact face 134 contactable with end 152 of the cigarette lighter designated generally by the numeral 138. As embodied herein, and as shown in FIG. 10, tapered plug face 42 includes a cylindrical extension 140 defining port 46 in which sleeve 44 is mounted. Importantly, sleeve 44 is positioned recessed from tip 144 of extension 140 a distance designated d2 in FIG. 10 sufficient to preclude contact between sleeve 44 and socket face 134 following inadvertent insertion of plug into cigarette socket 130.

It is also possible that a user may attempt to activate the plug portion of a conventional cigarette lighter by inserting it into socket component 24 of the present connector assembly invention. Although socket component 24 is capable of handling the current load imposed by cigarette lighter plug 138 if electrically activated, the internal heat generated could damage socket component 24, particularly non-conductive housing 70. Therefore, it is also preferred that socket component 24 include lockout means for preventing electrical connection to at least one of pin 76 and second contact 85.

Figure 8:
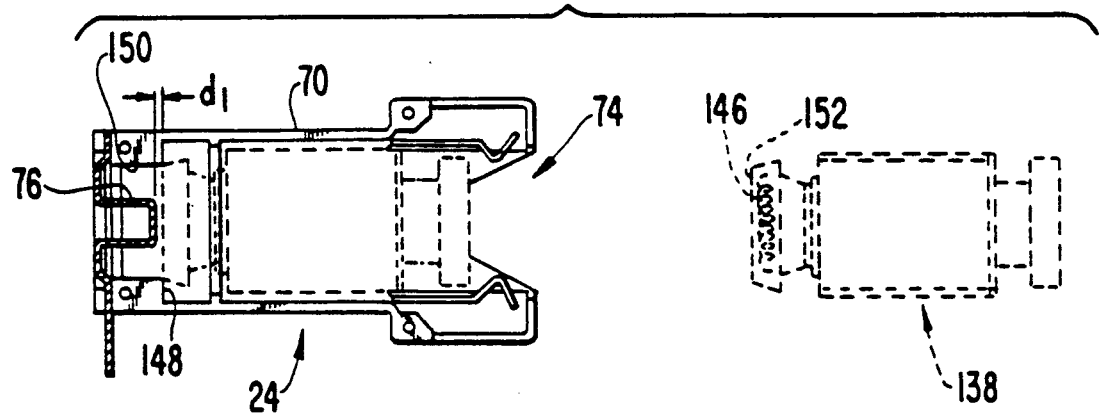
FIGS. 8 and 9 are sectional side views of the socket component of FIG. 1 showing details of structure for preventing electrical contact during insertion of an automotive cigarette lighter plug.
Figure 9:
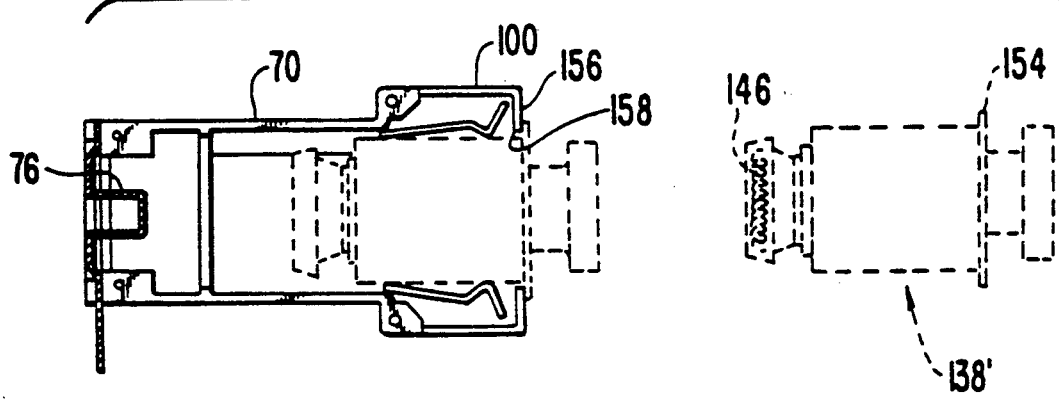

As embodied herein, and with initial reference to FIG. 8, socket component 24 is provided with boss 148 formed on the inside periphery of socket housing 70 surrounding pin 76. Boss 148 is made of a non-conductive material, preferably formed integrally with housing 70, and extends axially toward plug-receiving end 74 a distance greater than the comparable axial extent of pin 76, the difference in axial extend being designated by "d1" in FIG. 8. Also, the inner diameter 150 of boss 148 is sized to be less than the outer diameter of axial face 152 of lighter plug 138 to preclude electrical contact between pin 76 and heating element 146. For conventional cigarette lighter plugs having a flange element surrounding the plug, such as flange 154 surrounding plug 138' (see FIG. 9), the inwardly turned lip portion 156 of socket housing extension 100 is sized to have a minimum inner diameter 158 less than the outer diameter of lighter plug flange 154. Moreover, the axial extent of housing extension 100 is sized so that lip portion 156 is spaced from pin 76 a distance greater than the distance between flange 154 and heating coil 146, thus precluding electrical contact between pin 76 and coil 146.

A second embodiment of a low-voltage, high direct current connector assembly according to the present invention is illustrated in FIGS. 18-20. In these figures, the same reference characters are used as those included in FIGS. 1 and 2 in order to refer to elements having the same function, except that prime symbols ("'") are added to designate the second embodiment where the corresponding elements are not identical. For sake of brevity, detailed discussion of those functionally identical items is omitted and the following discussion instead focuses on the different elements which distinguish this second embodiment.

The connector assembly according to the second embodiment is identified by reference character 20' and comprises a socket 24' and plug 22', shown in perspective view in FIG. 18 and cross-sectional view in FIG. 19. A conventional plug 26 can also be used with socket 24', as shown by the dashed lines in FIGS. 18 and 19 which are included for reference purposes.

Referring to FIGS. 18 and 19, socket 24' has an elongated, hollow shape defining a central axis 72'. Socket 24' includes a pair of socket leads 200 and 202 for connecting to a source of power, such as batteries (not shown). Through leads 200 and 202, therefore, power is available at socket 24' for driving appliances (not shown). Additionally, socket 24' can be used for recharging of the storage means coupled to leads 200 and 202 when a source of power, such as a transformer power supply (not shown), is connected to socket 24'.

According to the invention, a plug is provided that is receivable in the socket upon insertion along the axis, the plug having a pair of plug leads. As embodied herein and illustrated in FIGS. 18 and 19, plug 22' is insertable into socket 24' by lining up axis 32' of the plug with the central axis 72' of the socket. As previously described with respect to the embodiment depicted in FIGS. 1 and 2, plug 22' has a generally cylindrical body 30' having an axial end 34' that includes an angled portion 42' to assist in insertion and placement of plug 22' in socket 24'. Body 30' has a rearwardly disposed finger gripping region 36' from which extends a pair of plug leads 38' and 40'. These leads are used to permit electrical connection of other appliances or power supplies to plug 22' for ultimate use with socket 24'.

The invention further includes first contact means for electrically connecting a respective one of the pair of socket leads to a respective one of the plug leads upon insertion of the plug into the socket, the first contact means being positioned proximate the axis. As shown best in cross-sectional view in FIG. 19, the first contact means include, according to a presently preferred embodiment, a pin 76' disposed in socket 24' and a corresponding sleeve 44' disposed in plug 22'. Pin 76' is electrically connected to lead 200 whereas sleeve 76' is electrically connected to lead 38. Thus, by inserting plug 22' into socket 24', pin 76' fits into sleeve 76' via a wiping arrangement so that electrical connection is made between leads 200 and 38.

Pin 76', formed of a suitable conductive material such as metal, is positioned within socket 24' along axis 72' proximate an insulating socket base 84'. An insulated spacer 204 may be provided for such mounting purposes, with connection between lead 200 and pin 76' being made via rivets 206. The particular means employed for so mounting and connecting pin 76' is considered obvious to persons of ordinary skill and need not be described further for purposes of understanding the present invention.

Sleeve 44' is also formed of a suitable conductive material, such as a metal material, which has a degree of spring sufficient to firmly engage pin 76' to provide electrical interconnection therewith. Sleeve 44' may be integrally formed within body 30', which preferably is molded from PVC or other plastic material, so that the sleeve remains in place within body 30' despite repeated insertions and withdrawals of plug 22' from socket 24'. Sleeve 44' is electrically connected to lead 38 via a crimping arrangement 208. Alternatively, lead 38 may be directly soldered to sleeve 44' or other connecting arrangements could be employed without departing from the spirit or scope of the invention.

The invention further includes second contact means for electrically interconnecting the other of the pair of socket leads to the other of the pair of plug leads upon insertion of the plug into the socket, the second contact means being positioned radially distant from the axis. As embodied herein, the second contact means include a pin 85' disposed on socket 24' and a corresponding sleeve 46' disposed in plug 22'. Pin 85' is connected to lead 202 and sleeve 46' is connected to lead 40 via a wiper arrangement so that upon insertion of plug 22' into socket 24', leads 202 and 40 are electrically connected together.

Pin 85' is located on an insulated shoulder 210 that is provided about a generally cylindrical housing 70' comprising socket 24'. The pin is electrically connected to lead 202 via a rivet arrangement 212 which is similar in nature to that described above with respect to pin 76'. However, other methods of mounting pin 85' and connecting lead 202 thereto may be employed within the spirit and scope of the present invention.

Housing 70' is prefereably conductive and may be formed of a metallic material. Housing 70' is electrically isolated from pin 76' and lead 200 via spacer 204. However, housing 70' is electrically connected to lead 202 as well via connecting portion 214 which is coupled to rivet 212. According to a presently preferred embodiment in which housing 70' is formed by stamping a metal sheet, connecting portion 214 may be integrally formed with the sheet and bent at an angle therefrom so as to permit engagement with rivet 212. Other arrangements for electrically connecting housing 70' with lead 202 may be employed, however.

Sleeve 46' comprises a conductive sleeve that has a degree of spring sufficient to ensure secure electrical contact with pin 85' when plug 22' is fitted into socket 24'. As in the case of sleeve 44', sleeve 46' can be integrally formed within body 30' during the molding process after having first been coupled to lead 40 via a crimping or soldering arrangement 216. However, other constructions of sleeve 46' and connections to lead 40 can be employed without departing from the spirit or scope of the present invention.

As shown in FIGS. 18 and 19, as well as by the top plan view of FIG. 20, pin 85' is positioned radially distant from central axis 72' and a preferably disposed adjacent the outer surface of housing 70' of socket 24 in parallel alignment to pin 76'. When plug 22' is inserted into socket 24', corresponding sleeve 46' disposed in plug 22' engages pin 85' at a site that is longitudinally distant from the point where pin 76' engages sleeve 44'. The radial position of pin 85' also serves to circumferentially align plug 22' relative to socket 24' in order to ensure proper insertion and connection.

The described invention provides for safe and secure connection between a plug 22' and a socket 24', particularly in high current applications, due to use of corresponding pin-and-sleeve couplings which provide wiping connections (as opposed to a point-to-point or contact connection) that are capable of passing high current levels. Plug 22' could, for example, be used to recharge the batteries (not shown) to which socket 24' is connected through leads 200 and 202, in which case plug 22' would itself be connected to a suitable power supply via leads 38 and 40. Due to the recessed nature of sleeves 44' and 46' within the plastic body 30' of plug 22', no danger of shorting is present since the plug has no exposed electrical elements.

A socket arrangement according to the subject invention also permits use of conventional plugs currently employed by many 12 volt appliances, as illustrated by the dashed plug 26 shown in FIGS. 18 and 19. By inserting plug 26 into socket 24' along axis 72', plug electrode tip 120 makes a point-to-point electrical contact with pin 76' while plug element 124 makes electrical contact with conductive housing 70'. The spring resilience of element 124 also serves to maintain plug 26 securely within socket 24'. In this fashion, socket 24' can be used to power conventional appliances (via plug 26) as well as to permit recharging (via plug 22'). It should be appreciated, however, that plug 22' need not be dedicated strictly to recharging purposes, but instead could also be connected to appliances for powering via the storage means (not shown) connected to socket leads 200 and 202.

FIG. 19A shows another embodiment of the socket assembly generally illustrated in FIG. 19. In FIG. 19A, the same reference characters are used to indicate elements that are the same as the embodiment shown in FIG. 19; accordingly, the following discussion focuses on those elements which differ from the previously described embodiment. In the socket assembly 24" illustrated in FIG. 19A, portion 214' (which was formed by stamping 216 via a rivet 218. This is in lieu of connecting to pin 85', as described previously.

The socket arrangement shown in FIG. 19A thus provides for three different electrical contact elements: pin 76', pin 85' and housing 70'. Each is electrically isolated from the other and each is provided with a separate lead 200, 202 and 216, respectively. In this fashion, the contact elements—particularly pin 85'—can be used for different purposes depending upon the electrical circuitry to which the leads are connected. For example, leads 200 and 216 can be used for connection to a conventional plug (such as illustrated by plug 26 in FIG. 19) for powering tools and appliances connected thereto; leads 200 and 202 can be used instead for connecting a plug (such as plug 22' in FIG. 19) for purposes of recharging a power source to which the leads are connected. An arrangement of this nature is described in further detail hereinbelow.

From the structure illustrated in FIG. 19A and described above, it should be appreciated that a connector assembly according to the present invention may therefore include a contact element, namely housing 70', that is electrically isolated from either of contact elements 76' and 85'. Thus, depending upon the particular plug that is to be inserted into the socket, different pairs of these contact elements (e.g., elements 76' and 85' or element 76' with housing 70') can be utilized to make the desired electrical connection between the socket and inserted plug.

It will be apparent to those skilled in the art that various modifications and variations can be made in the low-voltage, high current connector assembly of the present invention without departing from the scope of spirit of the invention. Thus, it is intended that the present invention cover the modifications and variations of this invention provided they come within the scope of the appended claims and their equivalents.

The aspect of the present invention relating to a mobile power system will now be discussed in detail. The system is related to the aforedescribed connector assembly in that the latter may be incorporated in the former, according to one embodiment that will be described below.

The first preferred embodiment of the mobile power tool and appliance operating system is shown schematically in FIG. 21 and is represented generally by the numeral 310. The system is intended for utilization with a number of different power tools and appliances, such as the car vacuum, car polisher, power drill, etc. devices listed in FIG. 21. It should be noted that the listing in FIG. 21 is not intended to be inclusive, and one skilled in the art would realize that the system of the present invention could be used with a greater number and variety of power tools and appliances.

Importantly, however, the power tools and appliances listed in FIG. 21 include some that are relatively low current devices, such as those shown in Group I, as well as the high current demand tools listed in Group II. Again, one skilled in the art would realize that certain of the tool or appliance types listed in FIG. 21, such as the power drill, could encompass models which more properly would belong in one or the other category depending upon size and application. Therefore, the list set forth in FIG. 21 is no intended to be restrictive in this sense. However, the FIG. 21 representation is intended to show that the present system can accommodate both low current tools and appliances and tools and appliances drawing relatively high currents. It should be noted also that the present system contemplates operation of the power tools and appliances only one-at-a-time.

Figure 22:
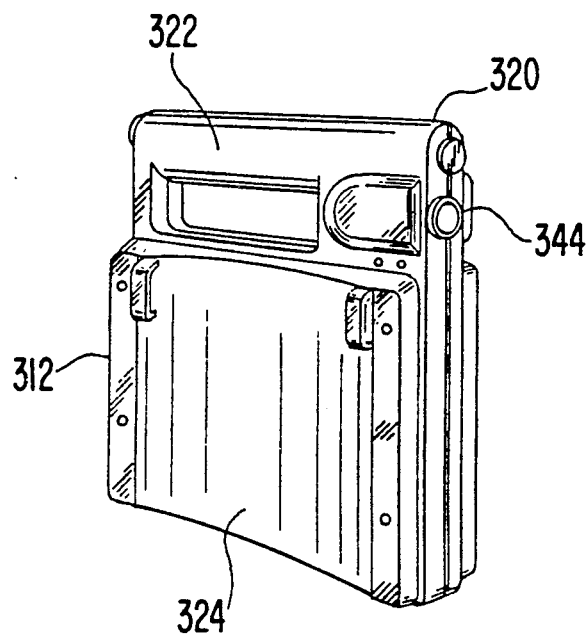
FIGS. 22 and 23 are perspective and side views of the portable battery pack preferred for use in the system of FIG. 21.
Figure 23:
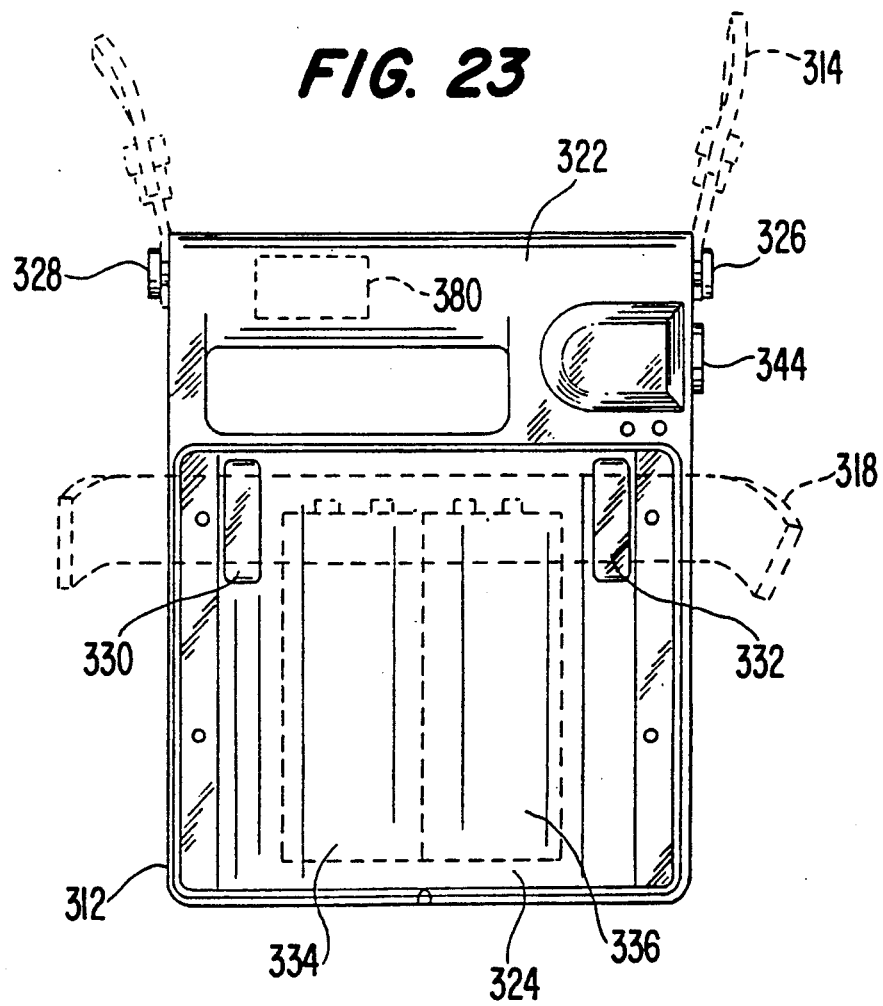
Figure 24:
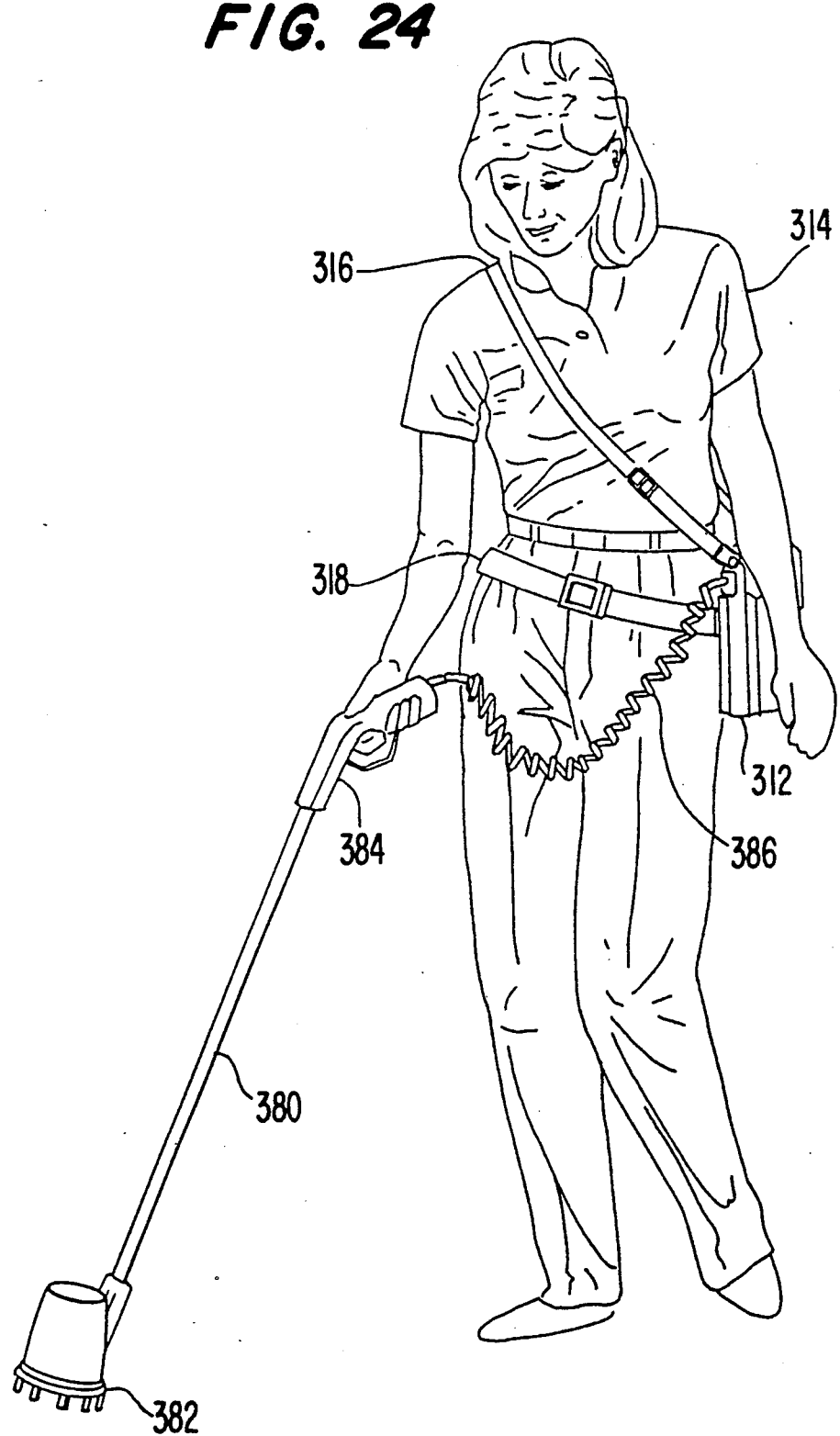
FIG. 24 is an illustration of the battery pack of FIGS. 22 and 23 to be worn by a user to power a high current capacity power tool.

In accordance with the present invention, the system for operating one-at-a-time a plurality of different hand-held, low-voltage, direct current power tools and appliances includes a portable battery pack. As embodied herein, and with initial reference to FIGS. 21-24, system 310 includes battery pack 312 which is intended to be carried by an operator, such as operator 314 in FIG. 24, such as by a combination of shoulder strap 316 and waist strap 318. Battery pack 312 specifically includes housing 320 which preferably can be formed from an impact resistant plastic in a two-piece "clamshell" construction for ease of assembly. As best seen in FIGS. 22 and 23, housing 320 includes an integrally formed hand grip portion 22 and a battery pack side 324 inwardly curved to conform to the rounded trunk of the operator. Battery pack housing 320 also includes stud members 326, 328 for attaching shoulder strap 314 and loop members 330, 332 for receiving waist strap 318. While battery pack 312 may be supported by operator 314 through either shoulder strap 316 or waist strap 318 alone, a more comfortable and secure attachment is provided through the use of both shoulder strap 316 and waist strap 318 simultaneously.

With continued reference to FIG. 23, portable battery pack 312 includes a plurality of rechargeable batteries, such as batteries 33 and 336 contained within housing 320. It is preferred that batteries 334, 336 be of the lead-acid type which exhibit superior voltage/current performance characteristics over extended temperature ranges. This extended operating range is intended to further increase the utility of the overall system.

Figure 25:
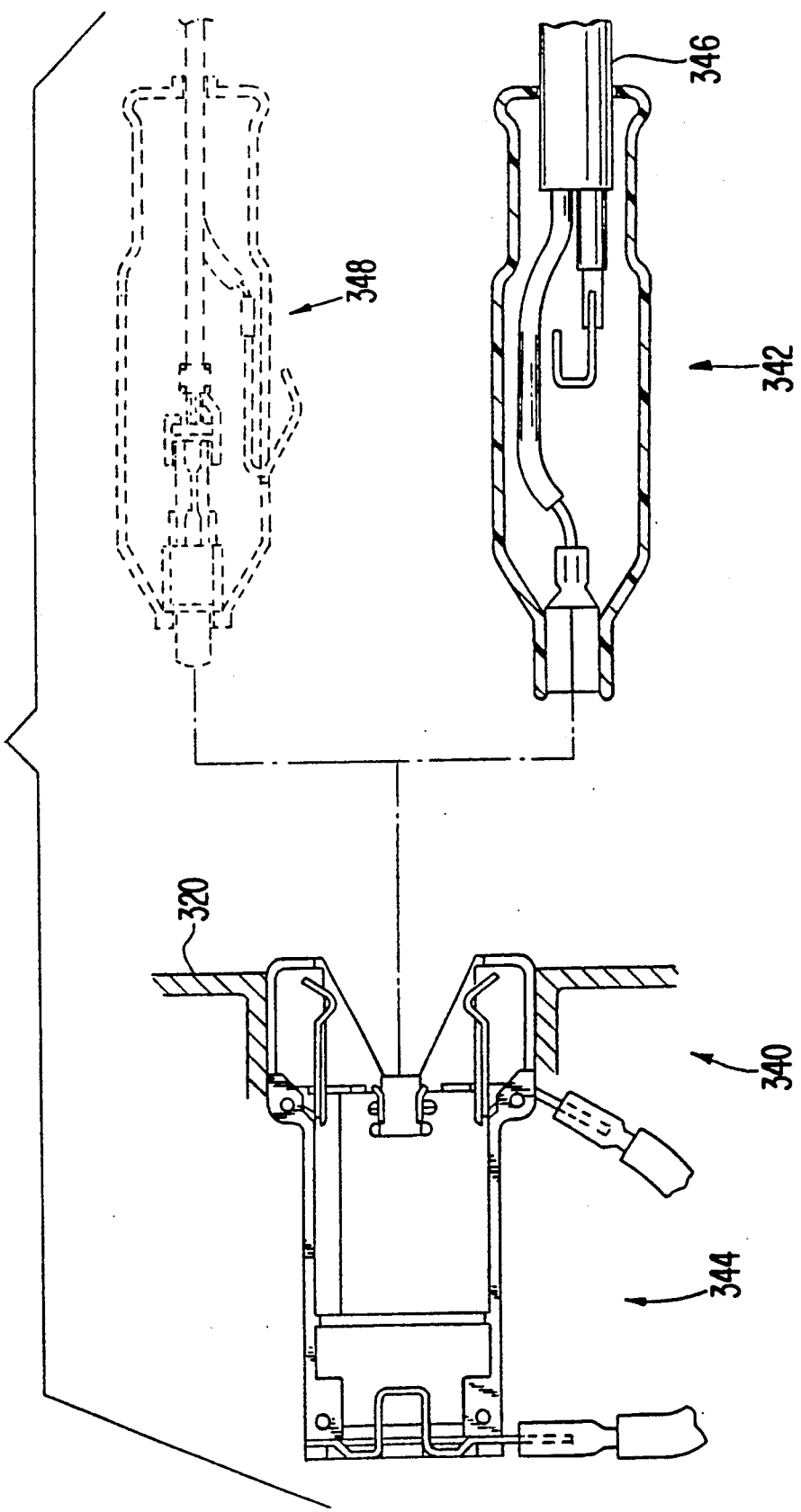
FIG. 25 is a schematic of a high current capacity plug-and-socket connector assembly preferred for use in the system of FIG. 21.

Further in accordance with the present invention, the system includes an electrical connector means for selectively connecting any one of the plurality of tools and appliances to the battery pack for mobile operation. As embodied herein, and with initial reference to FIG. 21, the system 310 includes connector means 340 depicted schematically in the figure. In the present preferred embodiment, and as best seen in FIG. 25, connector means 340 specifically includes a high current density plug-and-socket connector assembly including plug component 342 and socket component 344. Socket component 344 is incorporated in battery pack housing 320 while a plurality of plug components 342 are attached via power cord 346 to respective power tools and appliances. It is specifically contemplated that each power tool and appliance have a plug 344 permanently attached to a respective power cord 346, and that the connection between battery pack 312 and the respective power tool or appliance be achieved by insertion of the respective plug component 342 into the socket component 344 carried by battery pack 312.

The constructional details of the preferred high current plug-and-socket connector assembly 340, including plug component 342 and socket component 344, are set forth previously and in the application of Bailey et al. entitled "Low-Voltage, High Current Capacity Connector Assembly," Ser. No. 860,225 filed May 6, 1986, now abandoned, the disclosure of which is specifically incorporated herein by reference.

As is discussed in the above-mentioned application, socket component 344 is also specifically designed to accept conventional low current plug components, such as those typically used in automotive cigarette lighter sockets. Such a low-voltage plug component is depicted in broken line representation in FIG. 25 and is designated generally by the numeral 348. The ability of the present system to accommodate existing power tools and appliances having low current plug components of the type depicted in FIG. 25 is expected to further enhance the utility of the present operating system invention.

Figure 30:
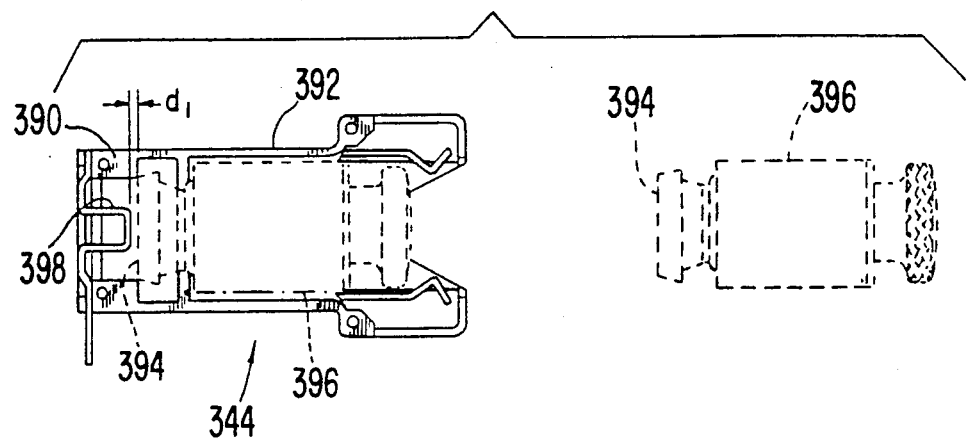
FIGS. 30 and 31 show details of the socket component of the connector assembly depicted in FIG. 25.
Figure 31:
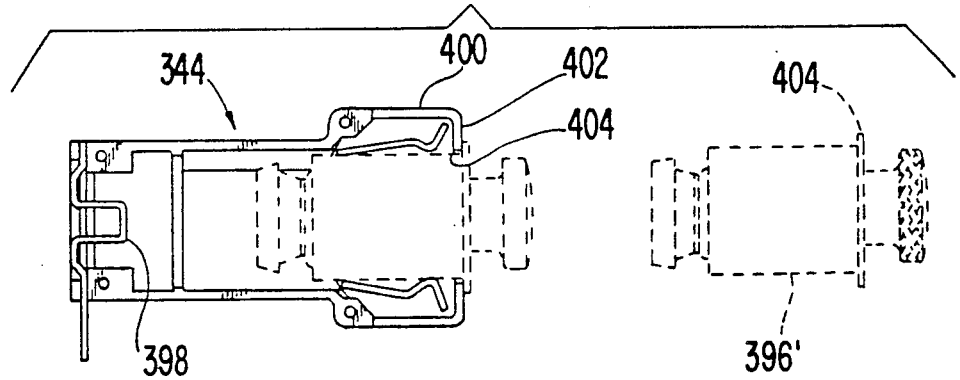

Because of the intended compatibility with conventional low-voltage, low current plugs, the socket component used in the operating system of the present invention preferably has means for preventing insertion of an automotive cigarette lighter plug. As embodied herein, and as depicted schematically in FIGS. 30 and 31, socket component 344 includes a boss 390 integrally formed with socket housing 392 of non-conductive material. Boss 390 is sized to intercept axial face 394 of lighter plug 396 (shown in broken lines) and space face 394 from socket electrical contact element 398 to prevent an electrical connection. Also, socket component housing extension 400 includes lip portion 402 sized to intercept flange 404 of lighter plugs 396' so equipped to prevent an electrical connection; see FIG. 31. The heat generated by activation of lighter plug 396 otherwise could damage socket component 344 and degrade the performance of operating system 310.

Figure 32:
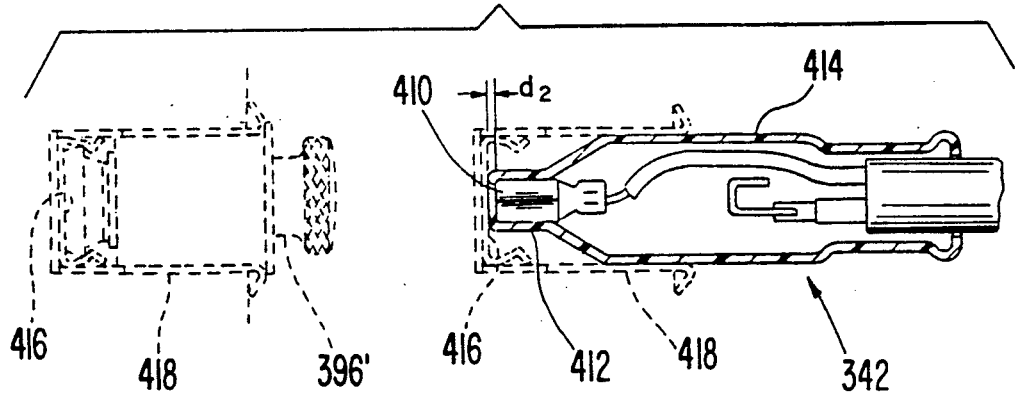
FIG. 32 shows details of the plug component of the connector assembly depicted in FIG. 25.

It is also preferred that the plug components used with the operating system of the present invention include means for preventing electrical connection when inserted in a standard automotive lighter socket. Such standard sockets are often fused for relatively low current (e.g., 6 amps) and such fusing could be blown or the lighter circuit damaged if an operator attempted to power high current tools from the lighter socket. As embodied herein, and with reference to FIG. 32 plug 342 includes electrical contact member 410 recessed in axial face 412 of plug housing 414. The recess prevents electrical contact between contact member 410 and contact face 416 of lighter socket 418 (shown in broken lines).

The details of the above-described safeguard means and lockout means are set forth in the referenced '255 application. One skilled in the art would appreciate that other safeguard and lockout means could be provided in the plug component and the socket component, respectively, of the present operating system invention.

Figure 26:
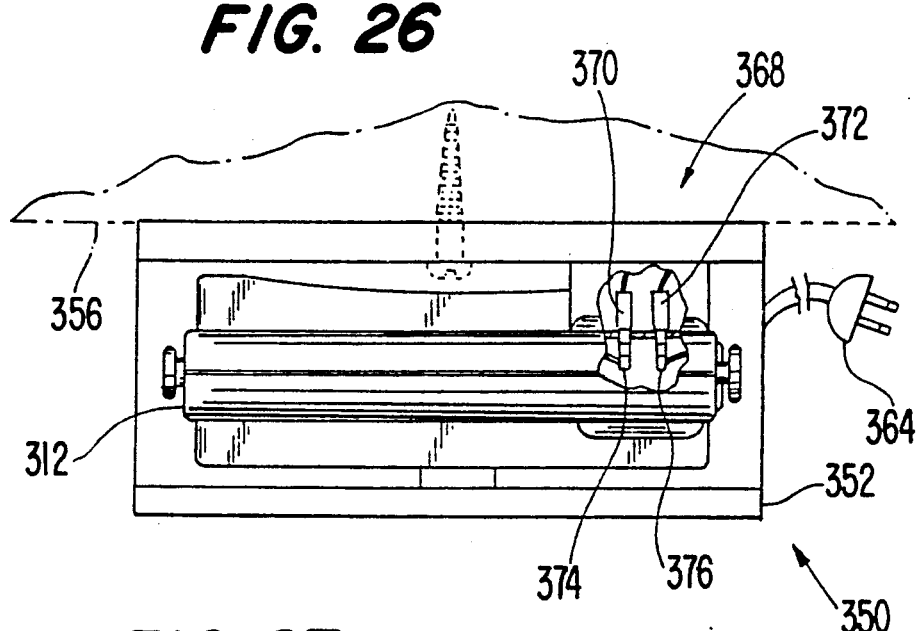
FIGS. 26 and 27 are top and side plan view schematics of a charging base for use in recharging the battery pack of the operating system depicted in FIG. 21.
Figure 27:
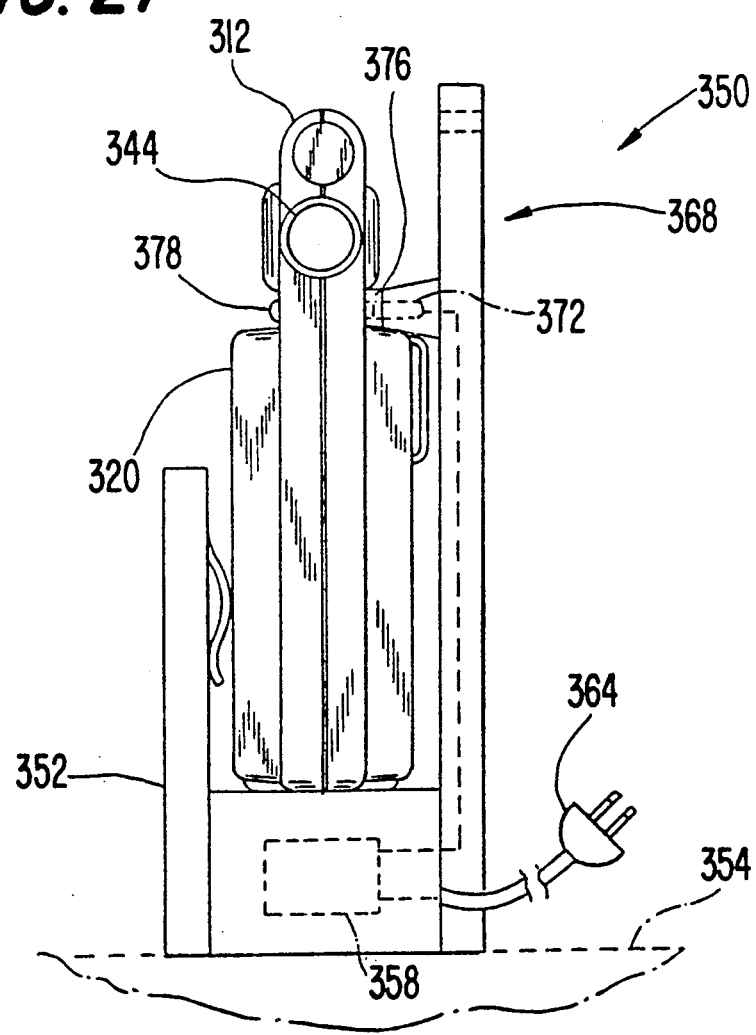

Further in accordance with the present invention, the mobile power tool and appliance operating system includes regulated charging means energizable by standard AC house current for use with the battery pack. The charging means specifically includes a housing and a charging circuit including a transformer and voltage regulator components contained in the housing. As embodied herein and with reference to FIGS. 26 and 27, system 310 further includes a charging unit designated generally by the numeral 350 in FIG. 21 and, as best seen in FIGS. 26 and 27, including housing 352 which also can serve as a stand for receiving battery pack 312 during charging operations. Housing 352 can be optionally rested on a horizontal surface such as surface 354 as depicted in FIG. 27 or can be mounted on a vertical surface such as surface 356 as depicted in FIG. 26. The exact shape of housing 352 is not considered important to the present invention beyond the fact that it contain the charging circuit means to be discussed henceforth. Thus, while the charging circuit is shown schematically located in the bottom portion of housing 352 in the FIG. 27 representation, and designated generally by the numeral 358, it is not critical that the charging circuit be so located, and a variety of different charging unit housing configurations and charging circuit locations would occur to one skilled in the art.

Figure 28:
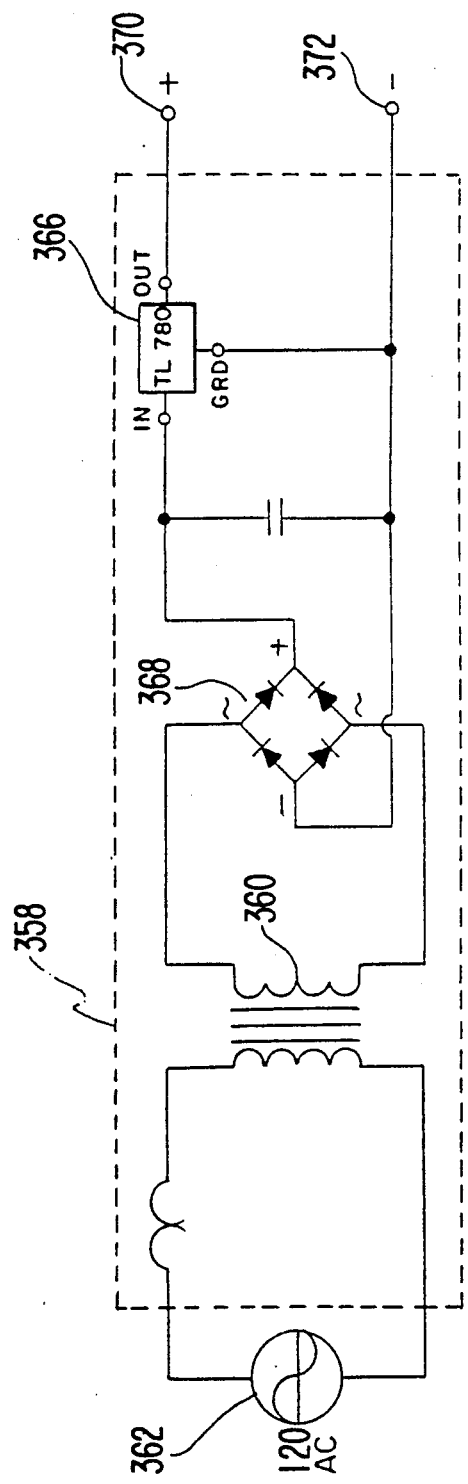
FIG. 28 is a schematic of the charging circuit used with the charging base depicted in FIGS. 26 and 27.

With specific reference to FIG. 28, there is shown a schematic representation of the details of the preferred charging circuit means 358. Specifically, charging circuit 358 includes a transformer 360 the input of which is shown operationally connected to a source 362 of standard house AC current, such as standard 120 VAC as is used in the United States or 220 VAC as is used in Europe. Source 362, of course, can be a standard wall outlet (not shown) and the charging means 350 shown in FIGS. 26 and 27 can include a standard plug and cord 364 for utilization with such an outlet. Returning again to FIG. 28, charging circuit means 358 also includes voltage regulator 366 which is operationally connected to transformer 360 through a full wave rectifier 368. Suitable commercially available products for use in circuit means 358 intended for 120 VAC power input include a Model 6050 transformer manufactured by Coils, Incorporated, Huntley, Ill.; A model WO2M rectifier manufactured by General Instruments; and a Model TL 780-15C voltage regulator manufactured by Texas Instruments.

Figure 29:
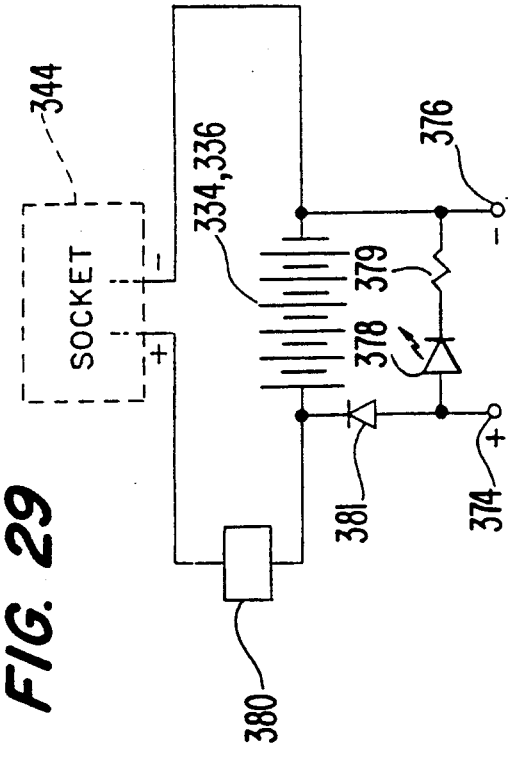
FIG. 29 is a schematic of the power circuit used in the battery pack depicted in FIGS. 22 and 23.

Further in accordance with the present invention, the operating system of the present invention includes electrical connector means for selectively connecting the battery pack to the regulated charging means. As embodied herein and with reference to FIGS. 26 and 27, the charging means/battery pack electrical connector means is designated generally by the numeral 368 and includes a pair of pin contacts 370, 372 mounted in housing 352 and operationally connected to the output of charging circuit means 358. Mounted in housing 320 of battery pack 312 are a pair of rivet contacts 374, 376 which are positioned to form an abutting contact with pin contact 370, 372 when battery pack 312 is received in housing 352 of charging unit 350. As depicted in the circuit schematic in FIG. 29, rivet contacts 374, 376 are electrically connected across the batteries of battery pack 312, such as batteries 334, 336. LED 378, shown schematically in FIG. 29 with associated resistor 379, is disposed on the outside of battery pack housing 320 (see FIG. 37) and provides a visual indication of power flow to batteries 334, 336 during charging operation. The LED is rated at 50 milliamps and the resistor at 660 ohms, 0.5 watts, 10%. Battery pack 312 also includes circuit breaker 380 connected in series between batteries 334, 336 and socket component 344 to provide protection against excessively high current flow in the battery circuit. A circuit breaker rated at 320 amps can be used. With reference to FIG. 23, circuit breaker 380 can be positioned conveniently in hand grip portion 322 of housing 320. Diode 381 in the FIG. 29 circuit schematic is a type 4002, 350 volt PIV.

Further in accordance with the present invention, each of the power tools and appliances intended for operation with the operating system is intended to include a power cord and a cord control means for biasing the power cord away from the ground and away from the operational end of the respective power tool or appliance. As embodied herein, and with specific reference to FIG. 24, power tool 380 which is a weed trimmer having an operational end (trimming head) 382 and a handle 384 includes power cord 386 which is spirally coiled to be self-retractable along its length. One end of coiled cord 386 is permanently connected to the tool 380 at handle 384 while a plug component 342 is attached to the other end of cord 386 and, in turn, is inserted into socket component 344 in battery pack 312. The retractably coiled power cord 386 prevents entanglement with the user's feet and arms while providing a full range of motion of power tool 380. The retractably coiled power cord 386 also prevents damage to the power cord caused by inadvertent engagement with operational end 382 of power tool 380.

A second embodiment of a portable power system in accordance with the present invention will now be explained with reference to FIGS. 33-36. It should be appreciated that the second embodiment is similar in many details to the embodiment previously described, e.g., portability, affixation to a belt or shoulder strap, rechargeability, etc. Accordingly, the following discussion focuses on those features which serve to distinguish the second embodiment from the aforedescribed one and, for the sake of brevity, does not repeat those features which are common to the first embodiment.

The second embodiment of a portable power system according to the present invention provides for greater flexibility in terms of use with various tools and appliances, as well as recharging of the system, as compared with the above described first embodiment. Referring to the various tools and appliances functionally depicted in FIG. 21, certain ones may have different power requirements than the other appliances depicted therein. For example, the tools and appliances illustratively shown in Group I may have low current requirements whereas those shown in Group II have high current requirements. It is also frequently the case that these tools and appliances have different voltage requirements. For example, the low current appliances shown in Group I may be operable at one voltage level, such as 12 volts, whereas those shown in Group II may be operable at another voltage level, such as 24 volts. The power system according to this second embodiment provides for connection to, and powering of, both types of tools and appliances, as described hereinafter.

Figure 33:
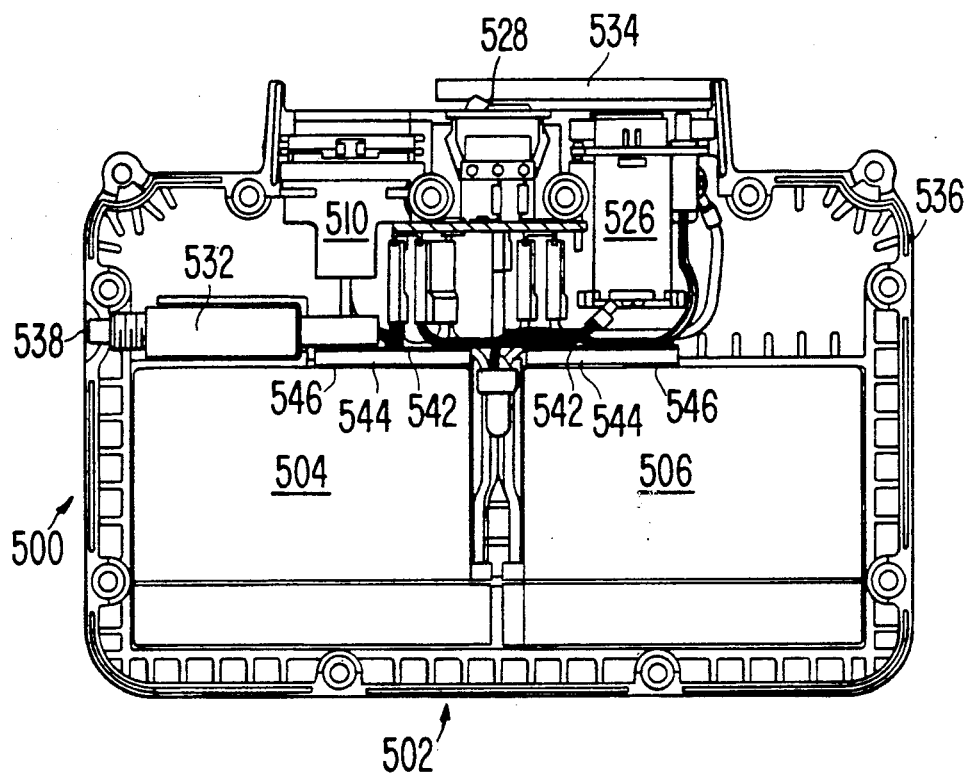
FIG. 33 is a cross-sectional view of a portable battery pack according to a second embodiment of the present invention.

A rechargeable system for operating one-at-a-time a plurality of different hand-held, direct current power tools and appliances according to this second embodiment is shown in FIG. 33 and identified by the reference character 500. The system includes a rechargeable portable battery pack, generally designated by reference character 502. In a presently preferred embodiment, battery pack 502 comprises a pair of lead acid batteries 504, 506 of the type previously described. However, it should be appreciated that other types and quantities of batteries can be employed without departing from the spirit or scope of the present invention. To permit continued reuse of the portable system, it is desireable that battery pack 502 be comprised of battery elements which are rechargeable, such as in response to a trickle charging arrangement that is well known in the relevant art.

According to the invention, first electrical connector means are provided for selectively connecting individual ones of the plurality of tools and appliances to said battery pack for mobile operation thereof. As embodied herein, the first electrical connector means are indicated by reference character 508 as illustratively depicted in FIG. 35. First means 508 includes a socket element 110 and a plug element 512. Plug element 512 is the end of a cord (not shown) that is connected to the tool or appliance (e.g., FIG. 1) which is to be powered by the power system. Socket element 510 is incorporated in the power system, as shown in FIG. 33.

Figure 35:
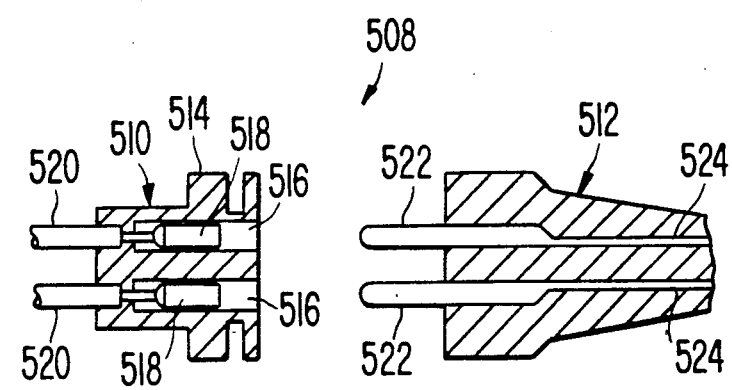
FIG. 35 is a cross-sectional view of a low current connector assembly of the battery pack depicted in FIG. 33.
Figure 36:
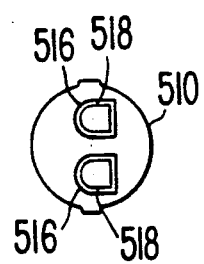
FIG. 36 is a top plan view of the socket component of the connector assembly depicted in FIG. 35.

In the presently preferred embodiment, first connector assembly 508 is designed to deliver power to low current tools and appliances, such as those represented in Group I of FIG. 21. These devices may operate at a first power level, e.g., 24 volts, so a two conductor arrangement to provide a power connection and a ground connection is shown in FIG. 35. Specifically, socket 510 comprises a body 514, which may be molded from PVC or some other plastics compound, that includes two channels 516 in which are disposed conductive wiping contacts 518. FIG. 36 shows these elements in top plan view. The contacts 518 are electrically coupled to respective leads 520 so that power can be delivered to the socket assembly.

To mate with the socket assembly 510, plug 512 includes two conductive pins 522 which, upon inserting plug 512 into socket 510, are received into channels 516 and electrically interconnect with respective wiping contacts 518. The plug is maintained in place by compressive wiping contact between contacts 518 and pins 522, which simultaneously serve to provide electrical interconnection. Power delivered from socket 510 and received by plug 512 is thereby provided to the appliance or tool (not shown) via leads 524 respectively coupled to pins 522.

The connector assembly described above is the presently preferred embodiment according to the invention. However, other arrangements for connectors may be employed without departing from the spirit or scope of the invention. For example, connector assemblies utilizing end-to-end or butting contacts can be employed. Alternatively, structures for ensuring mechanical interconnection between the plug and socket other than the spring-like compression of the wiping contacts described herein can be employed.

The present invention further includes second electrical connector means for connecting a recharging source to said battery pack for recharging thereof, the second electrical connector means also being adapted for selectively connecting other individual ones of the plurality of tools and appliances to the battery pack for mobile operation thereof. According to a presently preferred embodiment, the second connector means comprises the plug-and-socket arrangement shown in FIGS. 18–20, and discussed in detail above. The socket portion of such an assembly is shown in FIG. 33, as indicated by reference character 526, and is incorporated within the battery pack portion of the portable power system.

The plug portion of the second connector assembly (FIGS. 18–20) is coupled to a tool and appliance, such as one of those depicted in Group II of FIG. 21, which has different power requirement than those contained in Group I. In the presently preferred embodiment, for example, the tools and appliances intended to be coupled to the second connector assembly may require higher current levels than those contained in Group I. These tools and appliances may also operate at a different voltage level, e.g., 12 volts, as compared to those contained in Group I. Accordingly, a power system in accordance with the present invention is designed to deliver a different voltage level via the second connector assembly as compared with the voltage level delivered via the first connector assembly. The second connector assembly is also capable of delivering higher current levels than those associated with devices that may be connected to the first connector assembly.

Also according to the present invention, recharging means (such as circuit 358 depicted in FIG. 28) can be connected to the second electrical connector assembly, i.e., socket 526 for recharging battery pack 502. Hence, terminals 370, 372 (FIG. 28) would be connected to a power cord and plug (not shown) suitable for interconnection with socket 526. In this fashion, socket 526 serves the dual purposes of providing connection to appliances and tools, as well as facilitating recharging of battery pack 502.

Figure 34:
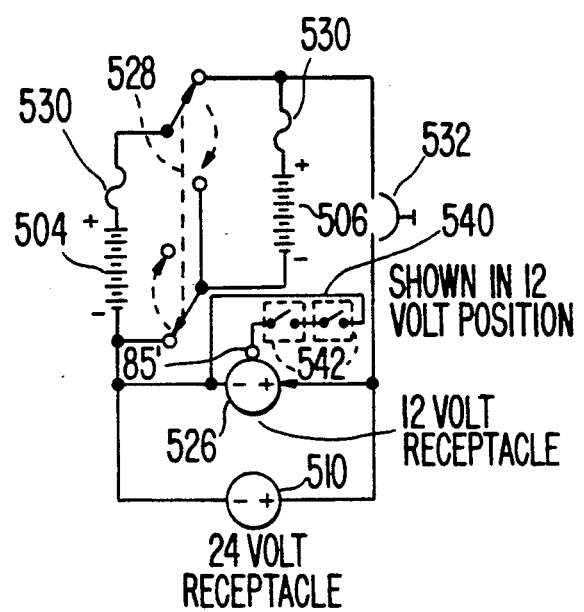
FIG. 34 is a schematic of the power circuit used in the battery pack depicted in FIG. 33.

A presently preferred circuit means for use in power system 500 according to the invention is schematically shown in FIG. 34. In this schematic, the same reference characters are used for batteries 504, 506, socket 510 and socket 526 as those used and discussed hereinabove. The circuit further includes a double pole, double throw switch 528, fuses 530, and a resettable circuit breaker 532. As can be understood from the schematic of FIG. 34, switch 528 is connected between batteries 504 and 506 so that the batteries are connected in series when switch 528 is in its first position and in parallel when switch 528 is in its second position.

In the presently preferred embodiment, batteries 504 and 506 are each rechargeable lead acid batteries capable of delivering 12 volts. Thus, when switch 528 is in its second position, batteries 504 and 506 are connected in parallel so as to make available a 12 volt output at sockets 510 and 526; this is the configuration of switch 528 as shown in FIG. 34. When switch 528 is moved to its other (first) position, batteries 504 and 506 are connected in series so that a 24 volt output is available at sockets 510 and 526. In this latter setting, batteries 504 and 506 are capable of delivering less direct current than in the setting where the batteries are connected in parallel, as is well known in the art.

In the event of a short circuit, power surge or other operating problem, circuit breaker 532 can trip to prevent damage to the system. Upon curing the problem, the circuit breaker can be reset. Circuit breakers suitable for such purposes are well known and need not be described in further detail in order to understand the present invention.

As can be appreciated from FIG. 34, output power (whether 12 volts or 24 volts) is delivered to both sockets 510 and 526 at the same time; however, it is desireable that only one tool or appliance be connected to the power system at a time in order to avoid problems such as excessive current drain. Accordingly, the power system may employ a sliding cover 534, as shown in FIG. 33, which selectively permits access to only one of sockets 510 and 526 at a time. In the arrangement shown in FIG. 33, for example, cover 534 has been moved so as to allow access to socket 510; sliding cover 534 to the left would allow access to socket 526 while simultaneously covering socket 510. Switch 528 may also be mounted to coact with a protuberence (not shown) on the underside of cover 534 so that movement of the cover concurrently causes the switch to move to the appropriate operating position. These structures are the subject of U.S. patent application Ser. No. 07/164,436, entitled "Control Apparatus For Switching A Battery Pack", filed Mar. 4, 1988, which is commonly owned by the same assignee; that application is expressly incorporated herein by reference.

Further detail regarding a presently preferred embodiment relating to recharging of batteries 504 and 506 can be appreciated with reference again to FIG. 34. The circuit means can include a circuit path 540 that is used specifically during the recharging operation. This arrangement is intended to be used with a receptacle 526 of the type illustrated and described above in connection with FIG. 19A, i.e., where receptacle 526 comprises a socket assembly having a separate pin 85' isolated from housing 70' so that pin 85' is used exclusively during recharging operations.

As shown in FIG. 34, recharging path 540 includes a pair of normally closed thermostats 542 connected between recharging pin 85' and the negative terminals ("—") of batteries 504 and 506. As explained in greater detail below, thermostats 542 are each in a thermal relationship with respective batteries 504 and 506 so as to sense operating problems within the batteries. Where a recharging plug (such as shown by plug 22' in FIGS. 18 and 19) is inserted into receptacle 526, pin 85' is used to conduct recharging current through circuit path 540 when both thermostats 542 are closed, i.e., normal battery operation. When overheating of the battery is sensed, either one or both of thermostats 542 opens so as to interrupt circuit path 540 and prevent further charging of the batteries from occurring.

As described previously, batteries 504 and 506 are rechargeable lead-acid batteries which, according to a preferred embodiment, each comprise multiple rechargeable cells. In the described batteries, six cells are employed in each of batteries 504 and 506. In the event one of these cells fails during recharging, the bad cell effectively becomes a short circuit causing high currents to flow into the remaining good cells within the particular battery containing the bad cell. In this situation, the high current flow causes the remaining good cells in the battery to overheat. Thermostats 542 are therefore employed, according to the invention, so as to detect this situation by responding to overheating of the remaining good cells in a battery that contains a bad cell. Once such a situation is detected, the corresponding one of thermostats 542 associated with the overheating battery opens so as to prevent further charging from occurring.

FIG. 34 shows the electrical interconnections relating to thermostats 542. The particular mechanical arrangement for thermally coupling the thermostats to respective batteries 504 and 506 is explained below in connection with FIG. 33.

FIG. 33 shows a preferred arrangement for encasing the aforedescribed elements of a power system according to the present invention. Battery pack 502, sockets 510 and 526, and the other elements comprising the circuit (FIG. 34) are all enclosed in a case 536 that can be made of an impact resistant material, such as PVC or other plastic. Resettable circuit breaker 532 is mounted so that its reset push button 538 is accessible at an appropriate point on the outside of case 536. Suitable arrangements and means for mounting these elements within case 536 are known and need not be described for purposes of understanding the present invention.

Also shown in FIG. 33 is thermostats 542 coupled individually to respective batteries 504 and 506. The coupling is achieved by affixing each thermostat 542 to a respective heat conductor 544 and securing the structures to batteries 504, 506 via a heat conductive adhesive 546. This provides for desired conduction of any heat generated by the cells of batteries 504, 506 to the thermostats 542 so that appropriate switching action can occur in the event of overheating.

In a presently preferred arrangement, thermostats 542 are devices available from Portage Electric Products and adhesive 546 is an adhesive compound available from Loctite Corp. under the tradename OUTPUT. Since thermostats 542 have a rectangular cross section, heat conductors 544 are formed so as to surround each respective thermostat on all sides except the top surface; this provides for the most effective transmission of heat to the thermostats. Heat conductors 544 are formed of an aluminum extrusion material, although other heat conducting materials may be employed. Thermostats 542 of the type described above are designed to open at approximately 140° F., which provides for suitable sensing of overheating conditions.

The described thermostats are approximately the width of only one cell of batteries 504, 506. Thus, heat conductors 544 are formed with a greater surface dimension, e.g., so as to overlap at least three cells of each battery, so that overheating can better be detected. For example, if the thermostats were directly coupled to the batteries, then only the cell immediately below the thermostat would be detected for overheating; if that cell was the defective one, then it would remain cool and overheating of the other cells in the battery might not be detected. By using heat conductors 544 which overlap several cells, a greater likelihood exists that one or more good cells (which overheat in the event of failure) will be covered so that overheating therein will be detected.

It should be appreciated that modifications can be made in the aforedescribed thermostat arrangement without departing from the spirit or scope of the present invention. For example, thermostats having larger heat detecting surfaces could be employed so as to eliminate the need for heat conductors 544. The heat conductors could also be affixed to the batteries by means other than the described thermal adhesive, such as by a clamp or screw arrangement, provided that such alternative means still allows for transmission of heat from the batteries to the thermostats so that overheating can be detected by the latter.

It can thus be appreciated from the foregoing description and accompanying drawings that a power system according to the second embodiment of the present invention allows for connection to different types of appliances and tools via two different connector means. Recharging of the battery pack of the power system may also be effected through use of one of the connector means so that the need for dedicated recharging connectors is eliminated. While a presently preferred embodiment according to the invention has been shown and described, other modifications may be made without departing from the spirit or scope of the invention. For example, circuits other than that shown in FIG. 34 can be used to provide the different voltage levels; additional connector assemblies may also be incorporated in the battery pack; or more than two individual batteries could be employed.

Accordingly, it will be apparent to those skilled in the art that various modifications and variations can be made in the mobile power tool and appliance operating system of the present invention without departing from the scope or spirit of the invention. Thus, it is intended that the present invention cover the modifications and variations of this invention provided the come within the scope of the appended claims and their equivalents.

What is claimed is:

1. A system for operating one-at-a-time a plurality of different hand-held, low-voltage, direct current power tools and appliances, the system comprising:

a portable battery pack;

electrical connector means for selectively connecting any one of the plurality of tools and appliances to said battery pack, for mobile operation thereof; wherein said electrical connector means includes a high current connector assembly having a plug component and a socket component, wherein the socket component is incorporated in said battery pack and said plug component is connected to said one of said tools and appliances; wherein said socket component includes means for receiving a selective one of said plug component and conventional low-voltage low-current appliance plugs of the type usable in automotive cigarette light sockets; and wherein said plug component includes safeguard means for preventing insertion into an automotive cigarette lighter socket.

2. A system for operating one-at-a-time a plurality of different hand-held, low-voltage, direct current power tools and appliances, the system comprising:

a portable battery pack;

electrical connector means for selectively connecting any one of the plurality of tools and appliances to said battery pack, for mobile operation thereof; wherein said electrical connector means includes a high current connector assembly having a plug component and a socket component, wherein the socket component is incorporated in said battery pack and said plug component is connected to said one of said tools and appliances; wherein said socket component includes means for receiving a selective one of said plug component and conventional low-voltage low-current appliance plugs of the type usable in automotive cigarette light sockets; and wherein said socket component includes lockout means for preventing insertion of an automotive cigarette lighter.

3. A system for operating one-at-a-time a plurality of different hand-held, low-voltage, direct current power tools and appliances, the system comprising:

a portable battery pack;

electrical connector means for selectively connecting any one of the plurality of tools and appliances to said battery pack, for mobile operation thereof;

wherein said electrical connector means includes a high current connector assembly having a plug component and a socket component, wherein the socket component is incorporated in said battery pack and said plug component is connected to said one of said tools and appliances; wherein said plug component includes safeguard means for preventing insertion into an automotive cigarette lighter socket; wherein said socket component includes means for receiving a selective one of said plug component and conventional low-voltage low-current appliance plugs of the type usable in automotive cigarette lighter sockets; and wherein said socket component also includes lockout means for preventing insertion of an automotive cigarette lighter.

4. A system for operating one-at-a-time a plurality of different hand-held, low-voltage, direct current power tools and appliances, the system comprising:

a portable battery pack;

first electrical connector means for selectively connecting any one of the plurality of tools and appliances to said battery pack, for mobile operation thereof;

wherein said first electrical connector means includes a high current connector assembly having a plug component and a socket component;

wherein said socket component is incorporated in said battery pack and said plug component is connected to said any one of the plurality of tools and appliances connected to said battery pack;

wherein said plug component includes a generally cylindrical housing formed from a non-conductive material and having an axis and an axial end insertable in said socket component, and including a first wiping contact member positioned at said insertable housing end; and wherein said socket component also includes means for receiving, and electrically connecting to, low current tool and appliance plugs intended for operation in an automotive cigarette lighter socket.

5. The system as in claim 4, further comprising:

charging means, energizable by standard AC house current, for charging said battery pack; and second electrical connector means for selectively connecting said battery pack to said charging means.

6. The system as in claim 5, wherein said charging means includes a charging circuit having a transformer operationally connected to a voltage regulator through a rectifier.

7. The system as in claim 4, wherein said battery pack includes at least one battery of the lead-acid type.

8. The system as in claim 4, wherein said battery pack further includes a plastic housing formed with a hand grip, and indicator means for indicating power flow to said at least one lead-acid battery.

9. The system as in claim 4, wherein said battery pack includes a housing at least one side of which is inwardly curved to conform to the trunk of a user;

means for optionally supporting said battery pack from the shoulder of a user; and means for optionally supporting said battery pack from a waist belt worn by a user.

10. The system as in claim 4, wherein said battery pack includes at least one battery and a circuit breaker operationally connected between said one battery and said socket component for interrupting excessive current flow.

11. The system as in claim 4, wherein said socket component includes lockout means for preventing insertion of an automotive cigarette lighter.

12. The system as in claim 4, wherein said plug component includes safeguard means for preventing insertion into an automotive cigarette lighter socket.

13. The system as in claim 4, wherein said socket component includes a non-conductive, generally cylindrical housing having an axis and a first plug-receiving axial end and a second axial end;

a first wiping electrical contact element positioned within said housing at the second axial end; and a second wiping electrical contact element electrically isolated from said first element and proximate the outer housing periphery of said housing at a preselected circumferential position, said second wiping contact element having at least one wiping contact surface parallel to said axis at said circumferential position, wherein said first and second wiping contact elements are configured for mating with complementary wiping contact members carried by the high current plug component during plug insertion to a predetermined axial location.

14. The system as in claim 13, wherein said socket component further includes lockout means for preventing electrical connection to at least one of said first and second wiping contact elements upon insertion of said plug component into the socket of a conventional automotive cigarette lighter plug of a kind having a generally cylindrical housing with an axially insertable end and having a heating element coiled in the axial face of the insertable lighter plug housing end.

15. The system as in claim 14, wherein said lockout means includes a boss formed on the inside periphery of said socket housing surrounding said first wiping contact element, said boss having an inner diameter less than that of the insertable lighter plug housing end and extending axially toward said plug receiving end a distance greater than the distance said first wiping contact element extends toward said plug receiving end.

16. The system as in claim 4, wherein said plug component further includes a second wiping contact member electrically isolated from said first member and positioned at the periphery of said plug housing, said second member having at least one planar wiping surface disposed parallel to said housing axis.

17. The system as in claim 16, wherein said plug component further includes safeguard means for preventing electrical connection to at least one of said first and second wiping contact members upon inadvertent insertion of the plug into a conventional automotive cigarette lighter socket of the type having a contact face disposed in a plane axially spaced from a plug-receiving end and perpendicular to the direction of plug insertion.

18. The system as in claim 17, wherein said safeguard means includes a non-conductive wall connected to said plug housing at said insertable housing end, said end wall having a port, and said first wiping contact member being positioned in said port and axially recessed from the outer surface of said non-conductive wall.

19. A rechargeable system for operating one-at-a-time a plurality of different hand-held, direct current power tools and appliances, the system comprising:
  a rechargable portable battery pack;
  first electrical connector means, incorporated in said battery pack, for selectively connecting individual ones of the plurality of tools and appliances to said battery pack for mobile operation thereof, said first electrical connector means including a low current connector assembly of the plug-and-socket type; and
  second electrical connector means, incorporated in said battery pack, for connecting a recharging source to said battery pack for recharging thereof, said second electrical connector means including means for selectively connecting other individual ones of the plurality of tools and appliances to said battery pack for mobile operation thereof, and including a high current connector assembly of the plug-and-socket type.

20. The system as recited in claim 19, wherein said first and said second electrical connector means both include wiping contacts.

21. A rechargeable system for operating one-at-a-time a plurality of different hand-held, directed current power tools and appliances, the system comprising:
  a rechargeable portable battery pack;
  first electrical connector means for selectively connecting individual ones of the plurality of tools and appliances to said battery pack for mobile operation thereof;
  second electrical connector means for connecting a recharging source to said battery pack for recharging thereof, said second electrical connector means including means for selectively connecting other individual ones of the plurality of tools and appliances to said battery pack for mobile operation thereof; and
  circuit means for selectively delivering a first voltage level to said first electrical connector means and a second voltage level to said second electrical connector means.

22. The system as recited in claim 21, wherein said battery pack includes a pair of lead acid batteries and said circuit means selectively connects said batteries in series to deliver said first voltage level and in parallel to deliver said second voltage level.

23. The system as recited in claim 22, wherein said circuit means further includes a switch to selectively deliver said first and said second voltage levels.

24. A rechargeable system for operating one-at-a-time a plurality of different hand-held, direct current power tools and appliances, the system comprising:
  a rechargeable portable battery pack;
  first electrical connector means for selectively connecting individual ones of the plurality of tools and appliances to said battery pack for mobile operation thereof, said first electrical connector means including a lower current connector assembly having wiping contacts;
  a second electrical connector means for connecting a recharging source to said battery pack for recharging thereof, said second electrical connector means also including means for selectively connecting other individual ones of the plurality of tools and appliances to said battery pack for mobile operation thereof, and wherein said second electrical connector means includes a high current connector assembly having wiping contacts; and
  circuit means for selectively delivering a first voltage level to said first electrical connector means and a second voltage level to said second electrical connector means.

25. The system as recited in claim 24, wherein said battery pack includes a pair of lead acid batteries and said circuit means selectively connects said batteries in series to deliver said first voltage level and in parallel to deliver said second voltage level.

26. The system as recited in claim 25, wherein said circuit means further includes a switch to selectively deliver said first and said second voltage levels.

27. A rechargeable system for operating one-at-a-time a plurality of different hand-held, direct current power tools and appliances, the system comprising:
  a rechargeable portable battery pack including at least one battery;
  first electrical connector means for selectively connecting individual ones of the plurality of tools and appliances to said battery pack for mobile operation thereof, said first electrical means including a low current connector assembly;

second electrical connector means for connecting a recharging source to said battery pack for recharging thereof, said second electrical connector means also including means for selectively connecting other individual ones of the plurality of tools and appliances to said battery pack for mobile operation thereof, and wherein said second electrical connector means includes a high current connector assembly; and circuit means, coupled between said battery pack and said first and second electrical connector means, for delivering power from said battery pack to said first and second electrical connector means to power the tools and appliances connected thereto and for delivering a charge supplied to said second electrical connector means to recharge said battery pack, said circuit means including thermostat means coupled in thermal relation to said battery pack for sensing overheating of said battery pack during recharging.

28. The system as recited in claim 27, wherein said thermostat means comprises a normally closed thermostated thermally coupled to said battery pack.

29. The system as recited in claim 27, wherein said thermostat means comprises a thermostat coupled to said battery pack via a heat conductor.

30. The system as recited in claim 29, wherein said heat conductor is coupled to said battery pack via a heat conducting adhesive material.

31. The system as recited in claim 27, wherein said at least one battery comprises a plurality of individual cells and said thermostat means is thermally coupled to more than one of said individual cells of said at least one battery.

* * * * *

UNITED STATES PATENT AND TRADEMARK OFFICE
CERTIFICATE OF CORRECTION

PATENT NO. : 5,095,259

DATED : March 10, 1992

INVENTOR(S) : R. Roby Bailey et al.

It is certified that error appears in the above-identified patent and that said Letters Patent is hereby corrected as shown below:

IN THE CLAIMS:

Column 26, line 36, change "lower" to --low--.

Signed and Sealed this

Twelfth Day of October, 1993

Attest:

BRUCE LEHMAN

Attesting Officer

Commissioner of Patents and Trademarks